(12) United States Patent
Gallardo et al.

(10) Patent No.: US 12,446,589 B2
(45) Date of Patent: Oct. 21, 2025

(54) PRODUCTION SYSTEM AND COUPLING UNIT FOR PRODUCING SAUSAGE-SHAPED PRODUCTS

(71) Applicant: POLY-CLIP SYSTEM GMBH & CO. KG, Hattersheim (DE)

(72) Inventors: Alfredo Lorente Gallardo, Bad König (DE); Silvio Beyer, Hattersheim am Main (DE)

(73) Assignee: POLY-CLIP SYSTEM GMBH & CO. KG, Hattersheim (DE)

( * ) Notice: Subject to any disclaimer, the term of this patent is extended or adjusted under 35 U.S.C. 154(b) by 0 days.

(21) Appl. No.: 18/143,201

(22) Filed: May 4, 2023

(65) Prior Publication Data

US 2023/0354831 A1   Nov. 9, 2023

(51) Int. Cl.
*A22C 11/00* (2006.01)
*A22C 11/02* (2006.01)
*A22C 11/12* (2006.01)

(52) U.S. Cl.
CPC ............ *A22C 11/02* (2013.01); *A22C 11/125* (2013.01)

(58) Field of Classification Search
CPC ... A22C 11/02; A22C 11/125; A22C 11/0209; A22C 11/0263
See application file for complete search history.

(56) References Cited

U.S. PATENT DOCUMENTS 6,135,870 A    10/2000  Hamblin et al.
11,523,617 B2  12/2022  Zurwieden et al.
(Continued)

FOREIGN PATENT DOCUMENTS

FR    3048853    *  9/2017  ............ A22C 11/02
FR    3048853 A1 *  9/2017

OTHER PUBLICATIONS

EPO; Application No. 22171908.1; Extended European Search Report dated Oct. 31, 2022.

*Primary Examiner* — Richard T Price, Jr.
(74) *Attorney, Agent, or Firm* — Fitch, Even, Tabin & Flannery LLP

(57) ABSTRACT

The invention relates to a production system for producing sausage-shaped products, in particular sausages, containing a flowable filling material in a tubular or bag-shaped packaging casing, the production system comprising:
  a filling unit for providing and conveying the filling material in filling direction into the tubular or bag-shaped packaging casing, the filling unit comprising an outlet;
  a clipping unit for closing the packaging casing filled with the filling material; and
  a coupling unit extending along a filling axis for coupling the filling unit and the clipping unit, the coupling unit comprising:
  an adapter piece configured to be arranged at the outlet of the filling unit;
  a connector piece configured to connect the clipping unit and the adapter piece; and
  a filling tube configured to be connected to the connector piece for feeding filling material into the tubular or bag-shaped packaging casing stored on the filling tube, wherein the coupling unit comprises at least one first tool for assembling the adapter piece to and disassembling the adapter piece from the outlet of the filling unit and/or for assembling the adapter piece to and disassembling the adapter piece from the connector piece, wherein the at least one first tool is captively held on the adapter piece and wherein the at least one first tool is arranged rotationally and/or translationally movable relative to the filling axis along the adapter piece.

17 Claims, 11 Drawing Sheets

(56) References Cited

U.S. PATENT DOCUMENTS

2007/0243805 A1 10/2007 Kruse
2022/0106151 A1 4/2022 Schleucher et al.
2023/0064116 A1 3/2023 Ebert

* cited by examiner

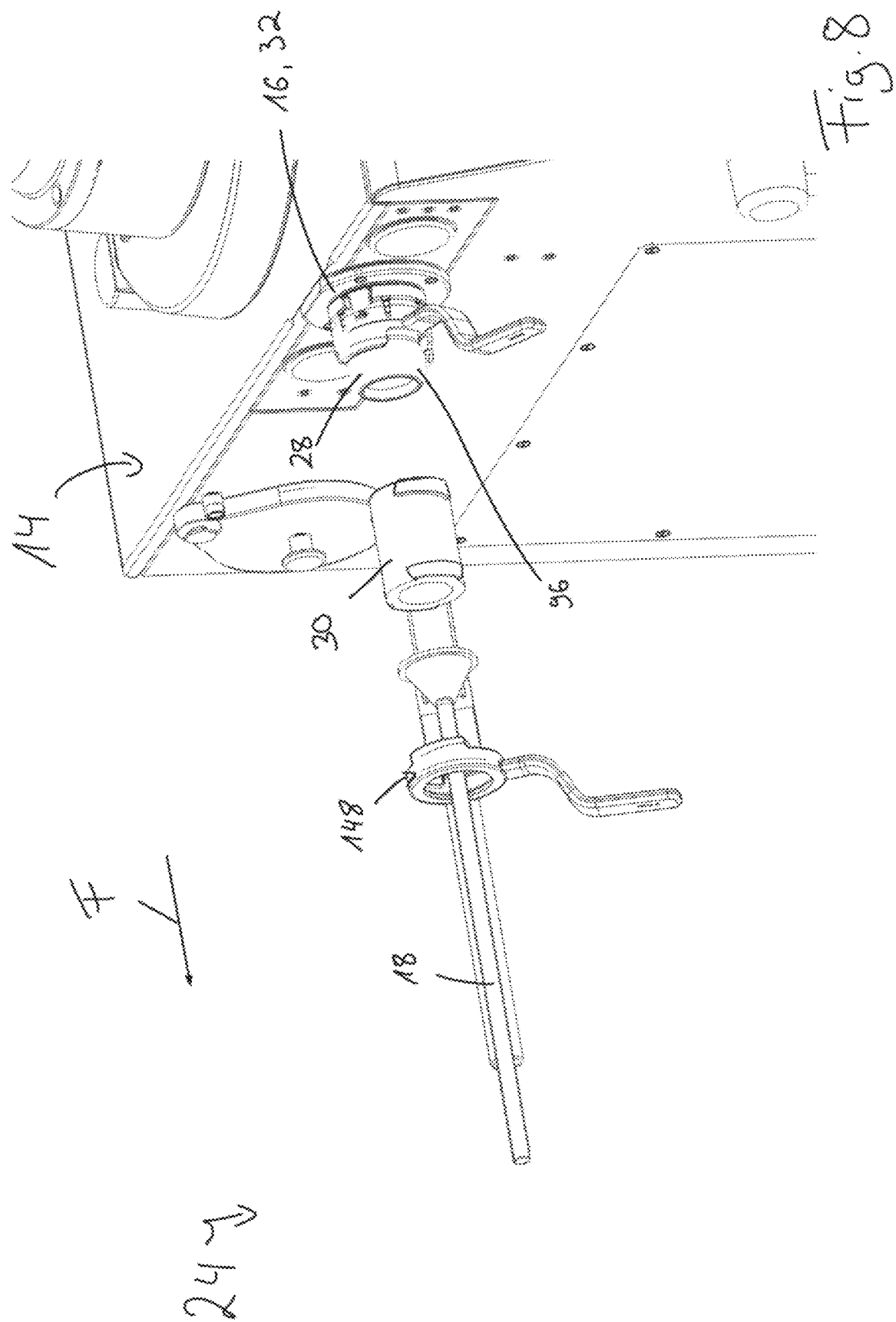

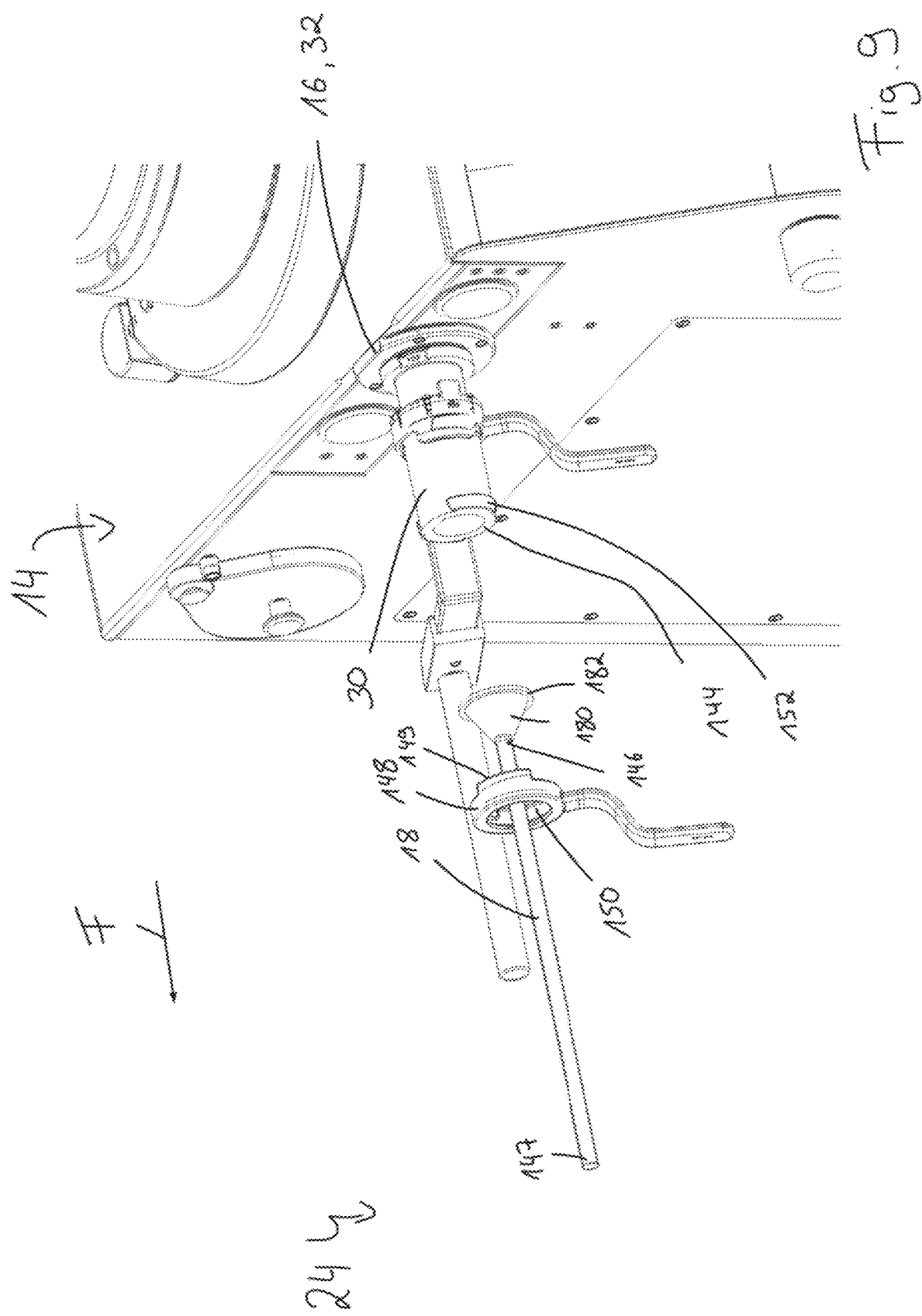

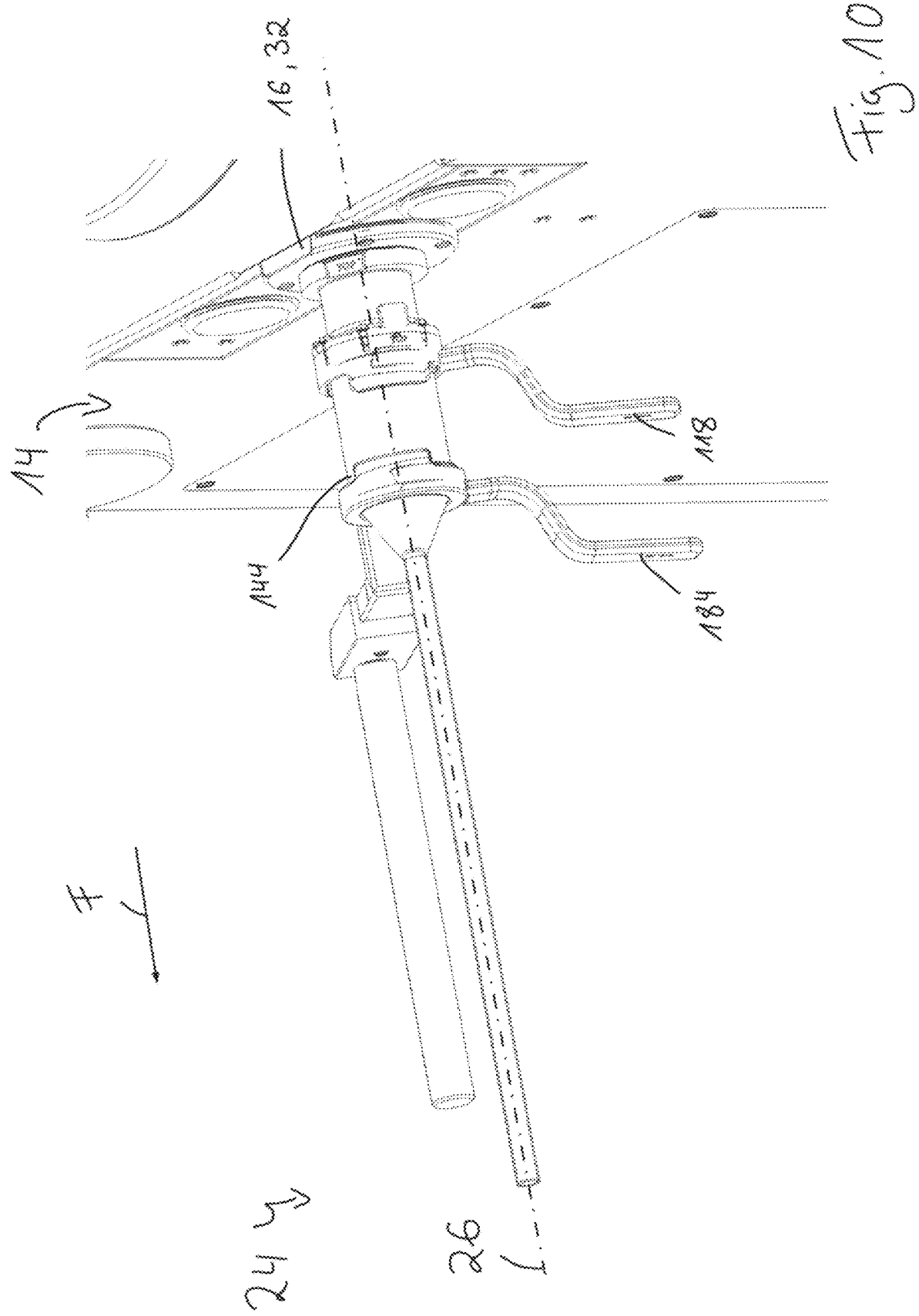

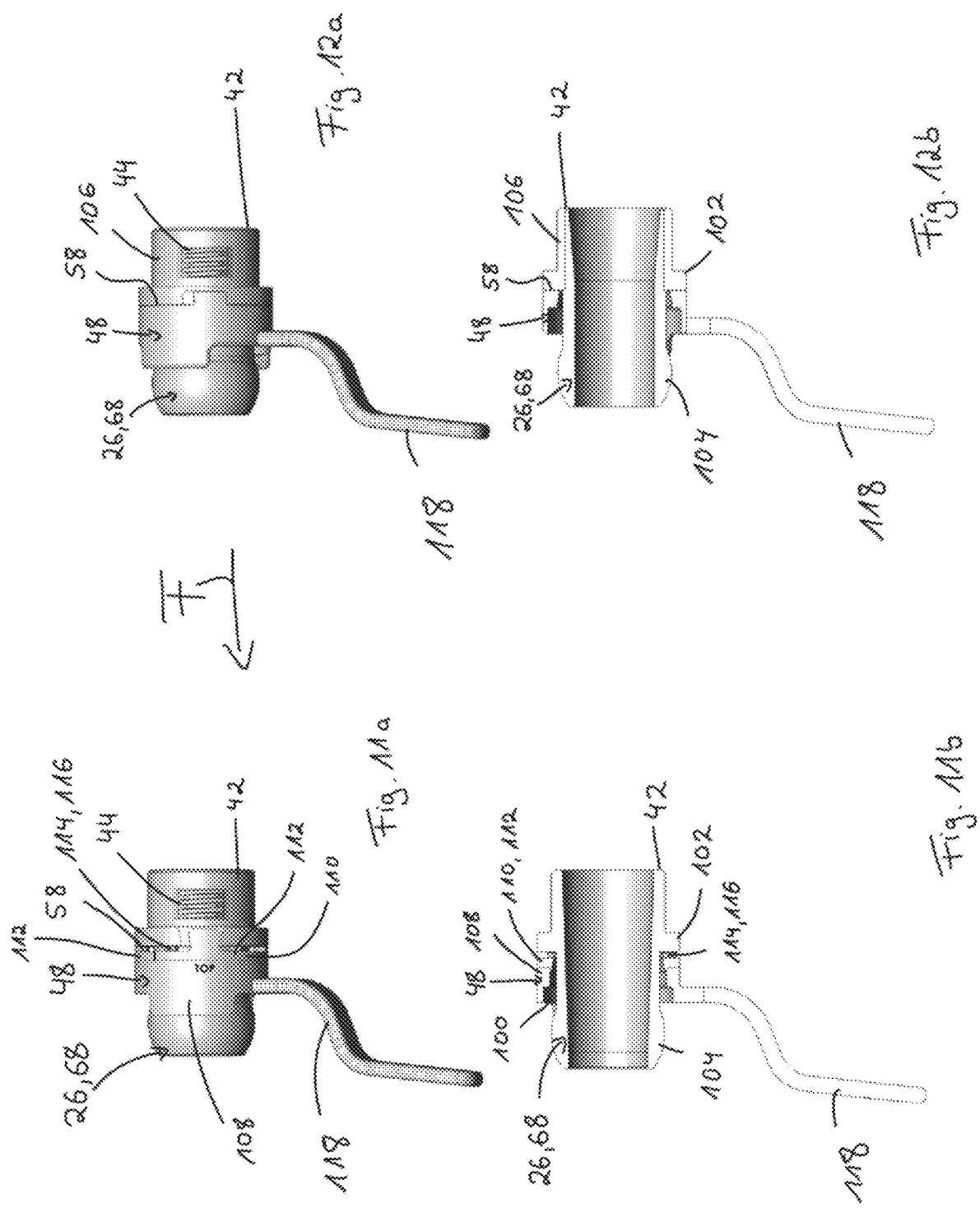

PRODUCTION SYSTEM AND COUPLING UNIT FOR PRODUCING SAUSAGE-SHAPED PRODUCTS

CROSS-REFERENCE TO RELATED APPLICATION

The present application claims the benefit of priority of European Patent Application No. 22171908.1, filed on May 5, 2022, the content of which is incorporated herein by reference in its entirety.

FIELD OF THE INVENTION

The present invention relates to a production system for producing sausage-shaped products, in particular sausages, containing a flowable filling material in a tubular or bag-shaped packaging casing and a coupling unit for usage in a production system for producing sausage-shaped products, in particular sausages.

BACKGROUND ART

In practice, it is known that, for example in the production of sausage-shaped products, in particular sausages, filling material is fed by a filling unit through a filling tube into a tubular or bag-shaped packaging casing. The filling unit provides and conveys the filling material in filling direction, wherein the filling unit comprises an outlet. The packaging casing can be stored on said filling tube and which is closed at its front end by a closure clip as a closure means by a clipping machine. The tubular or bag-shaped packaging casing is pulled-off from the filling tube while being filled by the feeding pressure. A coupling unit is arranged between the filling unit and the clipping unit to couple both.

Hygiene is particularly important in the food processing industry. Therefore, regular, usually daily cleaning of the production system and its components is required. In order to carry out a complete cleaning, the components must be disassembled or dismounted, respectively. In addition to cleaning the components, a product change may also require disassemble of the components. This is very time-consuming. Consequently, the production system and its components should be easy and quick to assemble and disassemble.

A known production system for producing sausage-shaped products comprises a filling unit and a clipping unit. A coupling unit extending along a filling axis is required to connect the filling unit and the clipping unit. The coupling unit comprises an adapter piece that is arranged at the outlet of the filling unit, wherein the adapter piece is screwed at the outlet by a union or coupling nut and then tightened with a tool wrench by a user. Further the coupling unit comprises a connector piece to connect the clipping unit and the filling unit in a predetermined position, wherein the connector piece is screwed at the adapter piece by a union nut and then tightened with said tool wrench again. The filling tube is screwed at the connector piece by a union nut and then tightened with said tool wrench again. The filling tube may be formed as a revolver with multiple filling tubes. For each tightening the same tool wrench is used. While it is common in a production environment to use tools. However, it is also a regular occurrence that the required tool cannot be found or is not readily available.

SUMMARY OF THE INVENTION

Thus, it is an object of the present invention to provide a production system and coupling unit for a production system for producing sausage-shaped products with easy and less effort- and time-consuming assembling and/or disassembling.

According to the present invention, there is provided a production system for producing sausage-shaped products, in particular sausages, containing a flowable filling material in a tubular or bag-shaped packaging casing. The production system comprises a filling unit for providing and conveying the filling material in filling direction into the tubular or bag-shaped packaging casing, the filling unit comprises an outlet, a clipping unit for closing the packaging casing filled with the filling material, and a coupling unit extending along a filling axis for coupling the filling unit and the clipping unit. The coupling unit comprises an adapter piece configured to be assembled to the outlet of the filling unit, and a connector piece configured to connect the clipping unit and the adapter piece. The production system further comprises a filling tube configured to be connected to the connector piece for feeding filling material into the tubular or bag-shaped packaging casing stored on the filling tube.

Further according to the present invention, the coupling unit comprises at least one first tool for assembling or mounting the adapter piece to and disassembling or dismounting the adapter piece from the outlet of the filling unit and/or for assembling or mounting the adapter piece to and disassembling or dismounting the adapter piece from the connector piece. The at least one first tool is captively held on the adapter piece and arranged rotationally and/or translationally movable relative to the filling axis along the adapter piece.

Consequently, the at least one first tool fulfils two functions, attaching the adapter piece to the outlet of the filling unit on the one hand and attaching the adapter piece to the connector piece on the other hand. To attach the adapter piece to the outlet and/or the connector piece, the at least one first tool can be rotated around the filling axis clockwise against the feeding direction. To detach the adapter piece from the outlet and/or from the connector piece, the at least one first tool can be rotated around the filling axis counterclockwise against the feeding direction. The rotational movement 'clockwise/counter-clockwise against feeding direction' is viewed from a perspective where an operator standing at the clipping unit looks along the filling axis at the filling tube. As already mentioned, the at least one first tool is arranged non-detachably at the adapter piece so that no time is lost searching for the tool during assembly or disassembly process.

The captively holding of the at least one first tool at the adapter piece means that the at least one first tool is in principle detachable from the adapter piece, but in the usual using of the at least one first tool and the adapter piece specific steps must be executed to detach the at least one first tool from the adapter piece. These steps are not executed in a regular usage of the coupling unit. These steps may require external tools, in particular specific tools. Further, the at least one first tool may not be detachable when the adapter piece is attached to the outlet of the filling unit and/or the connector piece. Even then, no external tools may be sufficient to dismount the at least one first tool from the adapter piece.

The adapter piece may comprise a first adapter end facing the outlet of the filling unit and a second adapter end facing the connector piece. It is advantageous if the adapter piece comprises an adapter thread and the outlet comprises an outlet thread, wherein the adapter thread and the outlet thread engage for coupling the adapter piece and the outlet of the filling unit. The adapter thread may be arranged at the first adapter end. It may conceivable that the adapter thread is formed as a male thread and that the outlet thread is forms a female thread. It is further advantageous if the outlet comprises a mounting ring. The outlet thread may be arranged at the mounting ring. The mounting ring is preferably releasably arranged at the filling unit. Preferably, the adapter thread comprises at least one adapter thread portion, wherein the at least one adapter thread portion has an angular extension in a range between 10° and 90°, in particular in a range between 20° and 60°, preferably about 30°. The adapter thread may not extend fully around the outer circumference of the adapter piece. Preferably, the outlet thread comprises at least one outlet thread portion, wherein the at least one outlet thread portion has an angular extension in a range between 90° and 180°, in particular between 120° and 150°, preferably about 135°. The outlet thread may not extend fully around the inner circumference of the outlet. The outlet thread preferably comprises at least one outlet thread recess to receive the at least one adapter thread portion of the adapter piece. The outlet thread recess may be formed by the gap between the at least one outlet thread portion.

To couple the adapter piece with the outlet of the filling unit, the adapter piece is inserted into the outlet, especially into the mounting ring, by a translational movement of the adapter piece along the filling axis. Thereby, the adapter piece is arranged in such a way, that the at least one adapter thread portion of the adapter piece is arranged in the outlet thread recesses of the outlet thread. As soon as the at least one adapter thread portion of the adapter piece is arranged circumferentially next to the outlet thread, the adapter piece is moved rotationally along the filling axis to engage the adapter piece and the outlet, in particular the mounting ring and/or the at least one adapter thread of the adapter piece and the outlet thread of the outlet. This ensures that the adapter piece can be securely attached to the outlet of the filling unit by one full rotation, by a half, by a third or by a quarter rotation.

As already mentioned above, the at least one first tool is captively held on the adapter piece. Thus, the user does not need any additional tools for safe assembly and/or disassembly of the adapter piece and/or of the connector piece. This reduces the number of parts to be provided and the risk to errors. It also prevents a tool from being misplaced. Furthermore, faster assembly is also possible, as the tool no longer needs to be aligned.

In a further preferred embodiment, the adapter piece has a first stop at his first adapter end, wherein the first stop is closer to the first adapter end than to the second adapter end, and/or a second stop at his second adapter end, wherein the second stop is closer to the second adapter end than to the first adapter end, to limit the movement of the at least one first tool that is arranged at the adapter piece. The first stop and/or the second stop can be designed in such a way, that the outer diameter of the first stop and/or the outer diameter of the second stop is larger than the inner diameter of the at least one first tool. The first stop can be formed by an adapter collar, that has an outer diameter that is larger than the inner diameter of the at least one first tool. The adapter collar may be made from the solid.

Consequently, the at least one first tool can just be moved into a determined range of positions, so the user does not need any effort to seek for his tool or tools. It is advantageous if the at least one first tool is configured in such a way, that the first tool is non-detachable from the adapter piece as long as the adapter piece and the outlet of the filling unit are connected and/or the adapter piece and the connector piece are connected. Thus, the first tool would be arranged at the coupling unit. The user does not need an extra tool to disassemble the adapter piece and the outlet and/or the adapter piece and the connector piece.

To arrange the at least one first tool at the adapter piece, especially when the adapter piece comprises a first stop and a second stop, the at least one first tool may be made of two or more parts. The at least one first tool may be made of two tool portions, that preferably extend circumferentially about 180°. One tool portion may be arranged at the adapter piece from one side and the other tool portion may be arranged at the adapter piece from the other side. Then, the tool portions may be attached to each other, in particular by fastening means like screws, to form the at least one tubular first tool. The combined two tool portions may have a smaller inner diameter than the outer diameter of the first stop and/or the second stop, so the movement of the at least one first tool would be limited between both stops.

The tool portions ensure that by coupling adapter piece and connector piece the adapter piece is biased to the connector piece. It is conceivable that the at least one first tool comprises further a tubular tool base with an inner diameter, wherein the inner diameter of the tool base is larger than the outer diameter of the first stop and/or the second stop, and/or wherein the inner diameter of the tool base is larger than the inner diameter the combined two tool portions. The tool base may be arranged at the adapter piece and then the two tool portions may be attached to the tool base, in particular by fastening means like screws, to form the at least one first tool. It is advantageous if the fastening means to assemble the at least one first tool may be arranged parallel or perpendicular to the filling axis. It is further advantageous if the fastening means have a fastening head like a screw head and wherein the fastening head is short, so the at least one first tool can be moved translationally close to the adapter collar. The fastening means may be short to form a small tool with respect to the filling axis, wherein more fastening means can be provided to compensate the low forced that can be absorbed by the small fastening means.

Alternatively, the at least one first tool is made up of one part or more parts, wherein the tool and each of the parts have a smaller inner diameter than the first stop and/or the second stop of the adapter piece. To arrange the at least one first tool at the adapter piece the first stop and/or the second stop may be arranged at the adapter piece after the at least one first tool is arranged at the adapter piece. Thereby, the at least one first tool is arranged at the adapter piece over the first adapter end and then the first stop is arranged at the adapter piece or the at least one second tool is arranged at the adapter piece over the second adapter end and then the second stop is arranged at the adapter piece. It is advantageous if the adapter collar is releasably arranged at the adapter piece. In this case the adapter collar may form the first stop. The adapter collar may be arranged at the adapter piece after the at least one first tool is arranged at the adapter piece, in particular by shifting the at least one first tool over the first adapter end. The first stop and/or the second stop and/or the adapter collar can be attached to the adapter piece by means of shrink-fitting or by screwing. It is also conceivable that the adapter collar comes with a shaft portion, wherein the shaft portion provides the outer thread of the adapter piece, so that the outer thread can only be provided with the adapter collar on the adapter piece. Thus, the adapter piece can be adjusted to different filling units or mounting rings. It also possible to change the adapter collar or the outer thread due to a damage without changing the whole adapter piece. It is nevertheless conceivable that the tool is designed in multiple parts and that the adapter collar is provided on the adapter piece after the first tool is attached to the adapter piece.

Preferably, the at least one first tool is moveable between a first position for releasably attaching the adapter piece at the outlet of the filling unit and a second position for releasably attaching the adapter piece at the connector piece. The first position and the second position may be spaced apart from each other along the filling axis. The first position may be at the first adapter end of adapter piece and/or the second position may be at the second adapter end of adapter piece. The first position may be determined by the first stop and/or the second position may be determined by the second stop. Thus, the at least one first tool can be used at different positions at the adapter piece and for different assembly and disassembly steps.

In a preferred embodiment the at least one first tool comprises at least one first coupling means and the adapter piece comprises at least one first counter coupling means to releasably engage the at least one first tool and the adapter piece. The at least one first tool is in the first position to engage the at least one first coupling means and the at least one first counter coupling means. The at least one first tool may have a first tool end facing the outlet of the filling unit and a second tool end facing the connector piece. The at least one first coupling means may be arranged at the first tool end.

The at least one first coupling means may be formed by at least one tooth and the at least one first counter coupling means may be formed by a protruding first ring with at least one recess to receive the at least one tooth. Alternatively, the at least one first counter coupling means may be formed by at least one tooth and the at least one first coupling means may be formed by a protruding first ring with at least one recess to receive the at least one tooth. The at least one recess in the first ring and/or the at least one tooth may be rectangular, trapezoidal, wedge-shaped, parallelogram-shaped, circular or semi-circular. If the at least one recess and/or the at least one tooth is trapezoidal, then the at least one recess and/or the at least one tooth taper in feeding direction or against feeding direction. Further, the at least one recess and/or the at least one tooth comprise rounded edges to ease insertion of the at least one tooth into the at least one recess. The at least one first coupling means may be arranged at the inner circumference and/or at an abutting end face of the at least one first tool. The at least one first counter coupling means may be arranged at the outer circumference of the adapter piece. The at least one first tool, in particular the at least one first coupling means, may be removable from the first position, in particular the at least one first counter coupling means, without detaching or untighten the adapter piece from the outlet of the filling unit. Therefore, the at least one first tool can be used to attach the adapter piece at his first end to the outlet of the filling unit and then to attach the adapter piece at his second end to the connector piece.

The at least one recess of the first ring may be enclosed by a first recess surface and a second recess surface of the first ring. The first recess surface may be circumferentially opposite to the second recess surface. The first recess surface and the second recess surface may have an angular distance in a range between 5° and 40°, in particular in a range between 10° and 35°, preferably about 30°. Two or more recesses in the protruding ring have an angular distance in a range between 20° and 180°, in particular in a range between 60° and 180°, preferably about 180°. The at least one first tool, in particular the at least one first coupling means, may engage with the first recess surface to tighten the adapter piece at the outlet of the filling unit and may engage with the second recess surface to untighten the adapter piece from the outlet.

The at least one tooth may be protruding parallel to the filling axis. The at least one tooth may have a first tooth surface and a second tooth surface, wherein the first tooth surface is circumferentially opposite to the second tooth surface. The first tooth surface and the second tooth surface may have an angular distance that is equal or smaller than the angular distance of the first recess surface and the second recess surface. The first tooth surface and the second tooth surface may have an angular distance in a range between 3° and 35°, in particular in a range between 5° and 30°, preferably about 20°. Two or more teeth may have an angular distance in a range between 20° and 180°, in particular in range between 60° and 180°, and preferably about 180°. The first tooth surface may engage with the first recess surface to tighten the adapter piece at the outlet of the filling unit and the second tooth surface may engage with the second recess surface to untighten the adapter piece from the outlet.

The at least one first tool may be configured in such a way, that the at least one first tool can be moved translationally and rotationally relative to the adapter piece to engage the at least one first coupling means and the at least one first counter coupling means. Then, the at least one first tool can be moved rotationally and pushes the adapter piece in the same direction to tighten the adapter piece at the outlet of the filling unit. To untighten and/or to disassemble the adapter piece from the outlet, the at least one first tool can be moved rotationally in the opposite direction.

In a preferred embodiment the at least one first tool comprises at least one second coupling means and the connector piece comprises at least one second counter coupling means to releasably engage the at least one first tool and the connector piece. The at least one first tool is in the second position to engage the at least one second coupling means and the at least one second counter coupling means. The at least one second coupling means may be arranged at the second tool end. The connector piece may have a first connector end facing the adapter piece and a second connector end facing the filling tube. The at least one second counter coupling means may be arranged at the first connector end.

The at least one second coupling means may be formed by a protruding second ring and the at least one second counter coupling means may be formed by a groove to receive the second ring. Alternatively, the at least one second counter coupling means may be formed by a protruding second ring and the at least one second coupling means may be formed by a groove. The second ring may be formed as a widening ring widening along the circumference of the connector piece or the at least one first tool. Preferably, the second ring may be formed by a wedge-shaped or trapezoidal ring. The groove may be formed as a tapering groove tapering along the circumference of the at least one first tool or the connector piece. Preferably, the groove is formed by at least one wedge-shaped or trapezoidal groove. It is conceivable that the second ring is formed by a widening ring and the groove is formed by a tapering ring, wherein the second ring widens in the same direction as the groove tapers. Further, the groove and/or the second ring comprise rounded edges to ease insertion of ring into groove. The at least one second coupling means may be arranged at the inner circumference and/or at an abutting end face of the at least one first tool.

The at least one second counter coupling means may be arranged at the outer circumference and/or at an abutting end face of the connector piece. The at least one first tool, in particular the at least one second coupling means, may not be removable from the second position, in particular the at least one second counter coupling means, without detaching or untighten the adapter piece from the connector piece. Therefore, the at least one first tool has a determined position when the adapter piece and the connector piece are coupled.

The groove may be enclosed by a first groove wall at the first end of the at least one first tool and a second grove wall at the second end of the at least one first tool, wherein the first groove wall and the second groove wall are spaced apart to each other along the filling axis. The first groove wall and/or the second groove wall may have an incline regarding the filling axis. If both, the first groove wall and the second groove wall, have an incline, then one incline must right oriented, and the other incline must be left oriented. The incline of the first groove wall and/or the second groove wall may be in range between 0.1 mm and 2.00 mm, in particular in a range between 0.2 mm and 1.00 mm, preferably in a range between 0.4 mm and 0.8 mm, more preferably about 0.6 mm. The first groove wall may be designed circumferentially continuous. The second groove wall may be formed by at least one groove wall portion. The at least one groove wall portion may have an angular extension in a range between 45° and 135°, in particular between 60° and 120°, and preferably about 90°. Two or more groove wall portions may have an angular distance in a range between 45° and 180°, in particular in a range between 60° and 120°, and preferably about 90°. The angular distance between two or more groove wall portions forms an opening to insert the second ring.

The second ring may be enclosed by a first ring wall facing the filling unit and a second ring wall facing the filling tube, wherein the first ring wall and the second ring wall are spaced apart from each other along the filling axis. The first ring wall and/or the second ring wall may have an incline regarding the filling axis. If both, the first ring wall and the second ring wall, have an incline, then one incline must right oriented, and the other incline must be left oriented. The incline of the first ring wall and/or the second ring wall may be in range between 0.1 mm and 2.00 mm, in particular in a range between 0.2 mm and 1.00 mm, preferably in a range between 0.4 mm and 0.8 mm, more preferably about 0.6 mm. The second ring may be formed by at least one second ring portion. The at least one second ring portion may have an angular extension in a range between 45° and 135°, in particular between 60° and 120°, and preferably about 90°. Two or more second ring portions may have an angular distance in a range between 45° and 180°, in particular in a range between 60° and 120°, and preferably about 90°. The second ring portions may be inserted into the opening formed by the angular distance between two or more groove wall portions.

To ensure easy matching of the first tool, in particular the groove, and the connector piece, in particular the second ring, it is advantageous if the first groove wall and the first ring wall have the same incline, in particular have no incline. If the incline is zero, then the first groove wall and the first ring wall are perpendicular to the filling axis. To ensure a secure attaching of the adapter piece to the connector piece the incline of the second groove wall and the second ring wall may be equal. Thus, the at least one first tool can easily come to rest against the connector piece.

The at least one first tool may be configured in such a way, that the at least one first tool can be moved translationally and rotationally relative to the connector piece to engage the at least one second coupling means and the at least one second counter coupling means. Using a second ring and a groove, the at least one first tool can be moved rotationally to clamp the ring in the groove for attaching the adapter piece to the connector piece. Due to clamping the at least one first tool cannot be removed from the connector piece without unsecure the connector piece from the adapter piece. Consequently, the at least one first tool has a fixed position at the coupling unit in the assembled state. To untighten and/or to disassemble the adapter piece from the connector piece, the at least one first tool can be moved circumferentially in the opposite direction.

In a further preferred embodiment, the adapter piece and the connector piece are configured in such a way, that they form an articulated connection to allow an angular offset between the filling unit and the clipping unit. The articulated connection may be formed by a joint, in particular a spherical joint, and a socket to receive the joint. The joint may be arranged at the second adapter end of the adapter piece and the socket may be arranged at the first end of the connector end of the connector piece or vice versa. The joint and the socket may be each arranged at the inner circumference of the adapter piece and the connector piece. The filling unit and the clipping unit does not have to be precisely aligned, because the articulated connection compensates the offset. Preferably, the joint is arranged at the adapter piece, wherein the joint causes an increase of the outer diameter of the adapter piece at the second adapter end. The joint may form the second stop of the adapter piece.

It is advantageous if the connector piece is connected to the clipping unit by a rod, wherein the rod is adjustable parallel and/or perpendicular to the filling axis to ensure a suitable distance between the filling unit and the clipping unit and/or a suitable height of the coupling unit, in particular of the filling tube. The rod may comprise a first rod portion perpendicular to the filling axis and second rod portion parallel to the filling axis. The first rod portion and/or the second rod portion may be telescopic and/or have a first rod tube that is moveably arranged inside a second rod tube to adjust the length of the first rod portion. To fix the length of the first rod portion and/or the second rod portion by fastening the relative movement the first rod tube and the second rod tube a fastening means, like a screw, is provided.

In a preferred embodiment of the inventive production system, the at least one first tool comprises at least one lever to handle the at least one first tool. It is advantageous if the lever is substantially inclined away from the filling unit. Thus, the at least one first tool can be handled with suitable distance to the filling unit and without bumping against the filling unit. The assembling or disassembling of the coupling unit could be executed by a human or a robot. The lever allows a good grip of the tool and a secure fixing of the adapter piece. The at least one lever is preferably z-shaped. The at least one lever may be arranged at the tool base of the at least one first toll. The lever may comprise a first lever portion that is substantially perpendicular to the filling axis and/or that adjoins the tool base, and/or a second lever portion that is substantially parallel or oblique to the filling axis, in particular has an angle in a range between 10° and 60°, preferably about 30° to the filling axis, and/or a third lever portion that is substantially perpendicular or oblique to the filling axis, in particular has an angle in a range between 70° and 90°, preferably about 80° to the filling axis. Preferably the first lever portion and/or the second lever portion and/or the third lever portion is inclined away from the filling unit.

It is advantageous if the coupling unit, in particular the adapter piece and/or the connector piece and/or the filling tube, is tubular and formed by a hollow shaft. The filling material is conveyed through the hollow shaft. The interface between the outlet and the adapter piece and/or the interface between the adapter piece and the connector piece and/or the interface between the connector piece and the filling tube is sealed by having a planar contact between each other. For sealing the coupling unit with planar contact precise manufacturing of the components is required. Thus, no additional sealings are necessary, wherein additional sealings are problematic regarding hygiene. Further, the coupling unit, in particular the adapter piece and/or the connector piece and/or the filling tube, is conical and tapers in filling direction. It is advantageous if no abrupt breaks are provided in the feeding direction, in particular at the interface between the outlet and the adapter piece and/or the adapter piece and the connector piece and/or the connector piece and the filling tube. Thus, a steady flow of the filling material through the coupling unit is ensured.

Preferably, the coupling unit comprises at least one second tool to attach connector piece and filling tube. The at least one second tool may comprise at least one third coupling means. The connector piece may comprise at least one third counter coupling means at the second connector end. The at least third coupling means may be designed in the same way as the at least second coupling means. The at least third counter coupling means may be designed in the same way as the at least second counter coupling means. The filling tube may have a first tube end facing the connector piece and a second tube end facing the clipping unit. To attach the connector piece to the filling tube the at least one second tool can be slid over the second tube end. Afterwards the filling tube along with the at least one second tool can be arranged at the second connector end of the connector piece. To couple the filling tube and the connector piece, the at least one second tool can by moved rotationally to engage the at least one third coupling means and the at least one third counter coupling means. Using a groove as at least one third coupling means and a ring as at least one third counter coupling means, the at least one second tool can be moved rotationally to clamp the ring in the groove for attaching the connector piece to the filling tube. Due to clamping, the at least one second tool cannot be removed from the connector piece without unsecure the connector piece from the filling tube. Consequently, the at least one second tool has a fixed position at the coupling unit in the assembled state. To untighten and/or to disassemble the connector piece from the filling tube, the at least one second tool can be moved circumferentially in the opposite direction.

It is conceivable that at least one sensor element is provided to detect a presence or absence of the filling unit, the coupling unit, in particular the adapter piece, the connector piece and/or the filling tube, and/or the clipping unit. The at least one sensor provides an indication to the user or a control unit, wherein the control unit could control the production system depending on the indication of the sensor element, in particular the start and stop of the producing. The at least one sensor may be arranged in or at the filling unit, the coupling unit, in particular the adapter piece, the connector piece and/or the filling tube, and/or the clipping unit.

The present invention further relates to a coupling unit for use in a production system for producing sausage-shaped products, in particular sausages, as explained in the foregoing. The production system comprises a filling unit for providing and conveying a filling material in feeding direction into tubular or bag-shaped packaging casing, the filling unit comprising an outlet. The production further comprises a clipping unit for closing a packaging casing filled with the filling material. The coupling unit extends along a filling axis and couples the filling unit and the clipping unit. The coupling unit comprises an adapter piece that is configured to be arranged at the outlet of the filling unit and a connector piece configured to connect the clipping unit and the adapter piece, and optionally a filling tube configured to be connected to the connector piece for feeding filling material into the tubular or bag-shaped packaging casing stored on the filling tube. The coupling unit further comprises at least one first tool for assembling the adapter piece to and disassembling the adapter piece from the outlet of the filling unit and/or for assembling the adapter piece to and disassembling the adapter piece from the connector piece. The at least one tool is configured to captively held on the adapter piece and is arranged rotationally and/or translationally movable relative to the filling axis along the adapter piece.

As mentioned previously, a filling tube can be part of the coupling unit and can be connected to the connector piece for feeding filling material into the packaging casing which can be stored on the filling tube. However, it is also possible that the filling tube is part of the clipping unit or clipping machine and the coupling unit connects releasably the filling unit to the filling tube.

The present invention further relates to a method for assembling a coupling unit for use in a production system for producing sausage-shaped products, in particular sausages. The method may comprise at least one of the following steps:

A) arrange the adapter piece at the outlet of the filling unit by moving it translationally along the filling axis opposite to the filling direction;

B) move the at least one first tool translationally along the filling axis against the feeding direction in the first position;

C) move the at least one first tool rotationally around the filling axis for attaching or tightening the adapter piece to the outlet of the filling unit;

D) move the at least one first tool rotationally around the filling axis in the opposite direction, wherein the rotational movement in step D) is smaller than in step C), wherein the at least one first tool does not untighten the adapter piece from the outlet of the filling unit;

E) move the at least one first tool translationally along the filling axis in feeding direction in the second position;

F) arrange the connector piece at the adapter piece; and

G) move the at least one first tool rotationally around the filling axis for coupling the adapter piece and the connector piece, wherein the at least one first tool cannot be released from the connector piece without releasing the connection between the adapter piece and the connector piece.

It is preferably if the following steps are executed before step A) to assemble the first tool using a tool base and at least two tool portions at the adapter piece:

A1) slide the tool base over a first adapter end or a second adapter end at the adapter piece;

A2) arrange one tool portion at one side of the adapter piece and arrange the other tool portion at the other side of the adapter; and A3) attach the at least two tool portions to each other and/or to the tool base.

It is preferably if the following steps are executed before step A) to assemble the first tool using at least two tool portions at the adapter piece:

A1) arrange one tool portion at one side of the adapter piece and arrange the other tool portion at the other side of the adapter; and A2) attach the at least two tool portions to each other.

For a more complete understanding of the invention, the invention will now be described in detail with reference to the accompanying drawings. The detailed description will illustrate and describe what is considered as preferred embodiments of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed herein after. Further, the features described in the description, the drawings and the claims disclosing the invention may be essential for the invention considered alone or in combination. In particular, any reference signs in the claims shall not be construed as limiting the scope of the invention. The wording "comprising" or "including" does not exclude other elements or steps. The wording "a" or "an" does not exclude the plurality. The wording "at least one" items comprising also the number 1, i.e. a single item, and further numbers like 2, 3, 4 and so forth. The word "about" includes a deviation of +3% of the total.

BRIEF DESCRIPTION OF THE DRAWINGS

In the accompanying drawings:

FIG. 8 shows an exploded front view of the coupling unit according to FIG. 7, wherein the adapter piece is attached to the filling unit;

FIG. 9 shows an exploded front view of the coupling unit according to FIG. 7, wherein the adapter piece and the connector piece are attached to the filling unit;

FIG. 10 shows a front view of the coupling unit according to FIG. 7, wherein the filling tube is attached to the connector piece;

FIG. 11a shows a first embodiment of the first tool and the adapter piece, wherein the first tool is made of multiple parts;

FIG. 11b shows a sectional view of the first tool and the adapter piece according to FIG. 11a;

FIG. 12a shows a second embodiment of the first tool and the adapter piece, wherein the adapter piece is made of multiple parts;

FIG. 12b shows a sectional view of the first tool and the adapter piece according to FIG. 12a;

FIG. 13b shows a front view of the first tool according to FIG. 13a.

DETAILED DESCRIPTION

Figure 1:
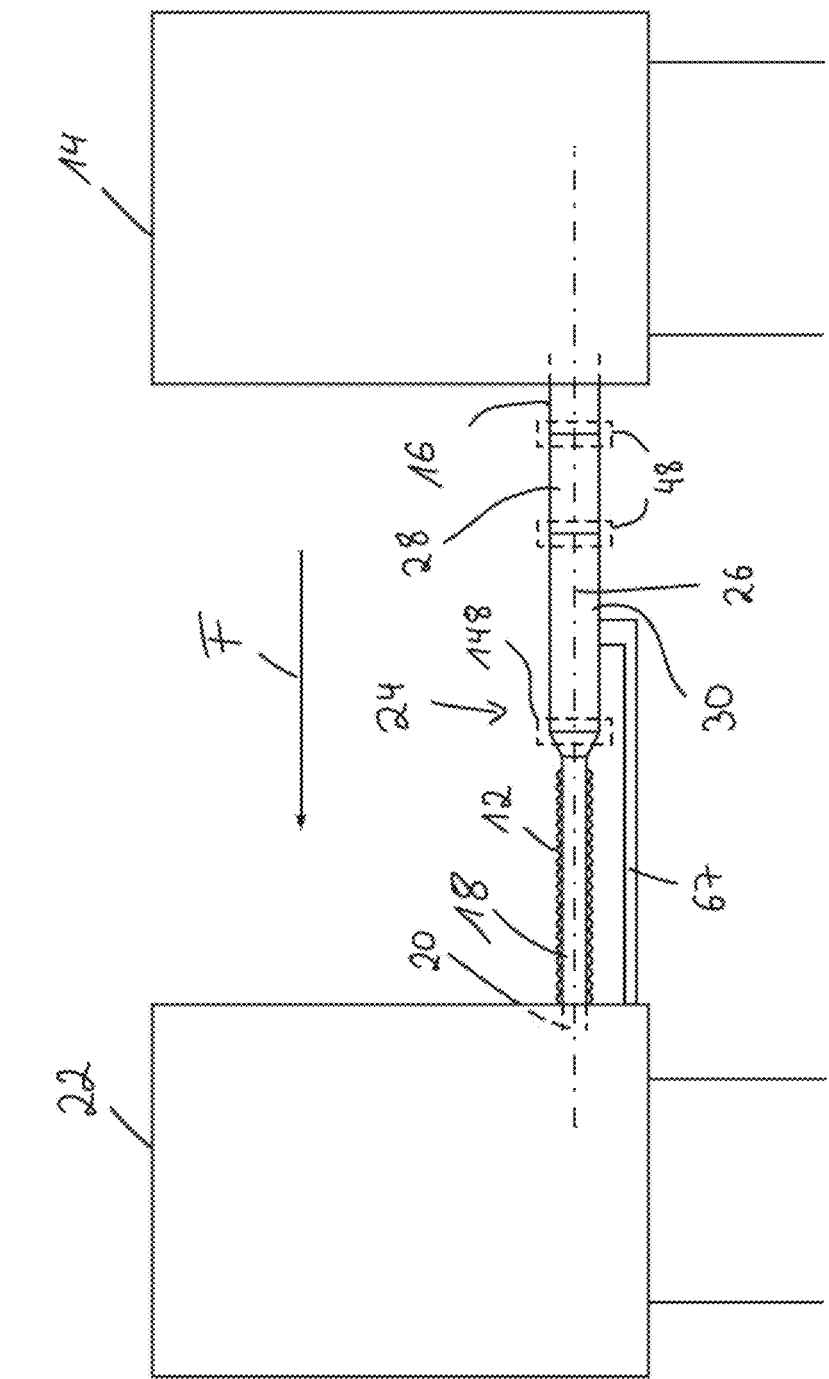
FIG. 1 shows a schematical view of a production system according to the present invention.

In FIG. 1, a schematical overview of a production system 10 for producing sausage-shaped products, in particular sausages, containing a flowable filling material in a tubular or bag-shaped packaging casing 12 is shown. A filling unit 14 provides and conveys filling material trough an outlet 16 of filling unit 14. Filling unit 14 is feeding the filling material in feeding direction F into a tubular filling tube 18, filling tube 18 comprises a discharge opening 20 for discharging the filling material into packaging casing 12. A supply of packaging casing 12 is made of a thin sheet material and is stored at the outer circumference of filling tube 18 in a folded manner like a concertina. The front end of packaging casing 12 facing in feeding direction F is closed by at least one closing means, such as a closure clip. A feeding pump (not shown) in filling unit 14 is feeding the filling material into packaging casing 12 while the feeding pressure of the filling material is pulling the packaging casing 12 off from filling tube 18. Gathering means of a clipping unit 22 form a plait-like portion of filled packaging casing 12, which is at least approximately free from filling material. Clipping unit 22 then places and closes at least one closure clip at the plate-like portion forming the rear end of the sausage-shaped product just produced, i.e., the end pointing against the feeding direction F.

Filling tube 18 and clipping unit 22 are coupled to filling unit 14 by a tubular coupling unit 24 as shown in FIGS. 1 and 10. Coupling unit 24, which forms a connecting tube between filling unit 14 and filling tube 18, extends along a longitudinal and horizontal filling axis 26 and comprises a tubular adapter piece 28 and a tubular connector piece 30. Adapter piece 28 has an at least approximately circular cross-section and is arranged at as well as connected to outlet 16 of filling unit 14 which has a corresponding circular cross-section. Connector piece 30 has also a circular cross-section and is arranged at and connected to said adapter piece 28. Further, coupling unit 24 can comprise filling tube 18, wherein filling tube 18 is releasably arranged at connector piece 30. Coupling unit 24, in particular filling tube 18, adapter piece 28 and connector piece 30, are made of a suitable material, like stainless steel.

Figure 3:
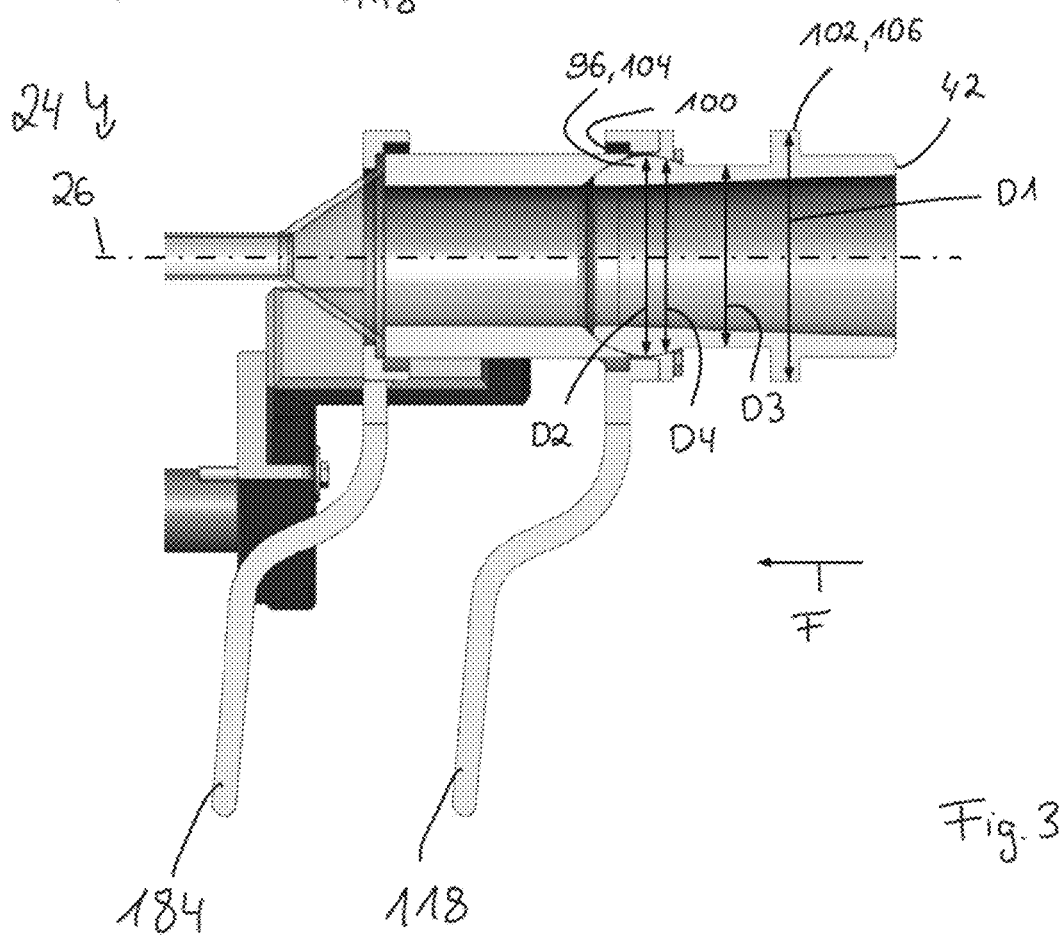
FIG. 3 shows a sectional view of the coupling unit according to FIG. 2.

According to FIG. 3, adapter piece 28, connector piece 30 and filling tube 18 are formed as a hollow shaft, wherein each hollow shaft, in particular the hollow shaft of adapter piece 28 and the hollow downstream end of filling tube 18 can be at least partially conical and wherein the cone tapers in feeding direction F to improve the flow of the filling material. The hollow shaft of adapter piece 28 and/or of connector piece 30 and/or of filling tube 18 is preferably designed in such a way and/or adapter piece 28 is arranged at outlet 16 of filling unit 14 and/or connector piece 30 is arranged at adapter piece 28 and/or connector piece 30 is arranged at filling tube 18 in such a way, that there are no abrupt breaks, so that a uniform flow of the filling material is ensured.

Adapter piece 28 and outlet 16 and/or adapter piece 28 and connector piece 30 and/or connector piece 30 and filling tube 18 form a flat contact for sealing, so no filling material can flow out of coupling unit 24 away from filling axis 26. Further seals are not provided, as they may be problematic to clean and to assemble.

Coupling unit 24 ensures a fast, safe, and exact coupling of filling unit 14 and clipping unit 22. Due to regular cleaning of production system 10 or product change, the components must be assembled and disassembled often. Therefore, it is important that the assembly and disassembly of coupling unit 24 is fast and easy. For assembly of coupling unit 24 at filling unit 14, adapter piece 28, connector piece 30 and filling tube 18 are attached one by one in feeding direction F, as shown in FIGS. 7 to 10.

Figure 2:
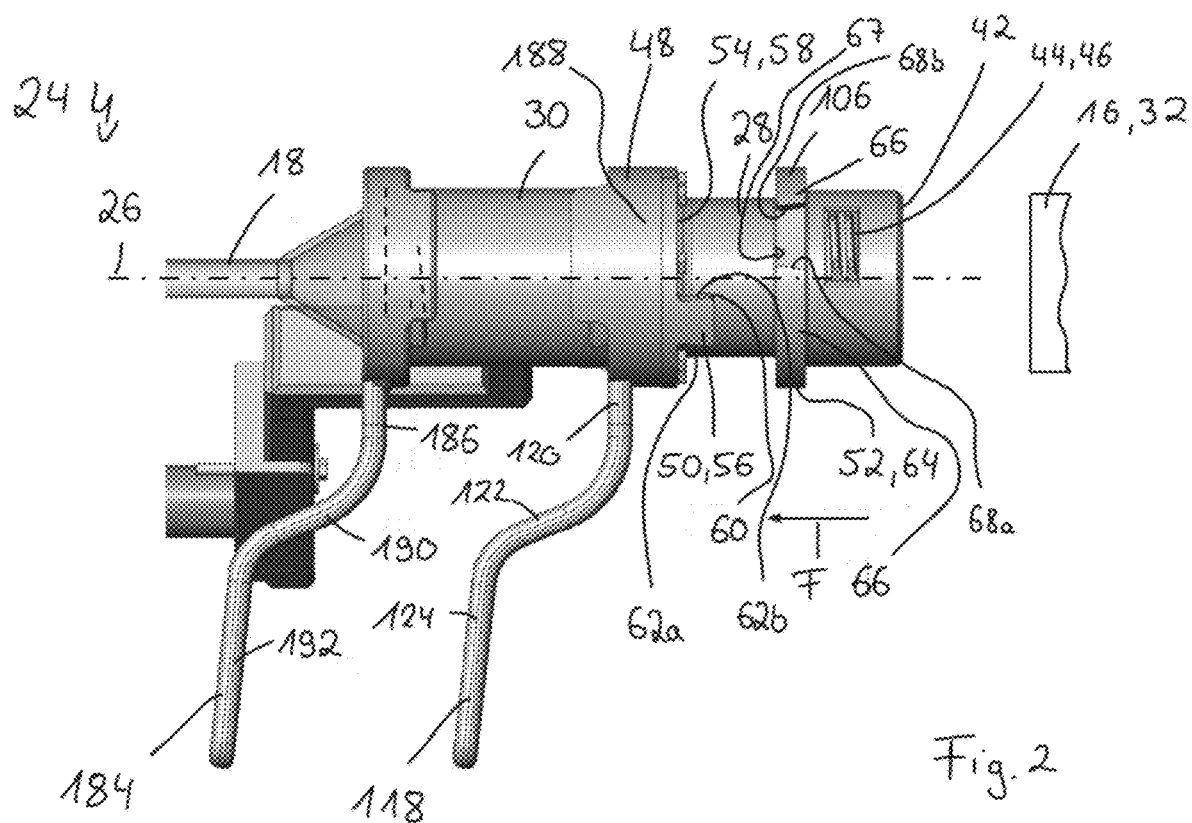
FIG. 2 shows a side view of a coupling unit of the production system according to FIG. 1.

FIG. 2 shows a coupling unit 24, wherein adapter piece 28, connector piece 30 and filling tube 18 are disassembled from filling unit 14. To attach adapter piece 28 to filling unit 14, outlet 16 comprises a tubular mounting ring 32 that is releasably arranged, in particular by fastening means 34 like screws, at filling unit 14. Mounting ring 32 protrudes with respect to filling unit 14 in feeding direction F. Mounting ring 32 comprises an outlet thread 36 to receive adapter piece 28, wherein outlet thread 36 is formed as a female thread. To change outlet thread 36 i.e., due to damage or product change, just mounting ring 32 has to be changed. Outlet thread 36 comprises two outlet thread portions 38, wherein two outlet thread portions 38 circumferentially enclose two outlet thread recesses 40, which are at least substantially oriented perpendicular to filling axis 26. Outlet thread portions 38 have an angular extension in a range between 90° and 180°, in particular between 120° and 150°, preferably about 135°. Outlet thread portions 38 have an angular distance about 180°, wherein the angular distance is the quotient of 360° and the amount of outlet thread portions 38.

In FIG. 2, adapter piece 28 comprises a first adapter end 42 facing outlet 16. To releasably attach adapter piece 28 to outlet 16 by a threaded engagement, adapter piece 28 comprises an adapter thread 44 at or at least close to first adapter end 42 that engages with outlet thread 36. Adapter thread 44 is formed as a male thread. Adapter thread 44 comprises two adapter thread portions 46. Adapter thread portions 46 have an angular extension in a range between 10° and 90°, in particular between 20° and 60°, preferably about 30°. Adapter thread portions 46 have an angular distance about 180°, wherein the angular distance is the quotient of 360° and the amount of adapter thread portions 46.

In FIG. 8, to couple adapter piece 28 with outlet 16 of filling unit 14, adapter piece 28 is inserted into outlet 16, in particular into mounting ring 32, by a translational movement of adapter piece 28 along filling axis 26 opposite to filling direction F. Thereby, adapter piece 28 is arranged in such a way, that adapter thread portions 46 of adapter piece 28 are arranged in outlet thread recesses 40 of outlet thread 36. As soon as adapter thread portions 46 are arranged circumferentially next to outlet thread 36, in particular next to outlet thread portions 38, adapter piece 26 is moved rotationally according to filling axis 26 to engage adapter piece 28 and outlet 16, in particular adapter thread portion 46 and outlet thread portion 38. This ensures that adapter piece 28 can be securely attached to outlet 16 of filling unit 14 by a quarter rotation.

To attach and/or tighten adapter piece 28 to outlet 16, adapter piece 28 comprises a first turning tool 48. For releasable engagement of first turning tool 48 and adapter piece 28, first turning tool 48 comprises two first coupling means 50 and adapter piece 28 comprises two first counter-coupling means 52. First turning tool 48 can be moved in a first position at or at least close to first adapter end 42 to engage first coupling means 50 and first counter-coupling means 52. First turning tool 48 comprises a first tool end 54 facing filling unit 18, wherein first coupling means 50 are arranged at first tool end 54. First counter-coupling means 52 are arranged closer to first adapter end 42 than to second adapter end 74.

Figure 13B:
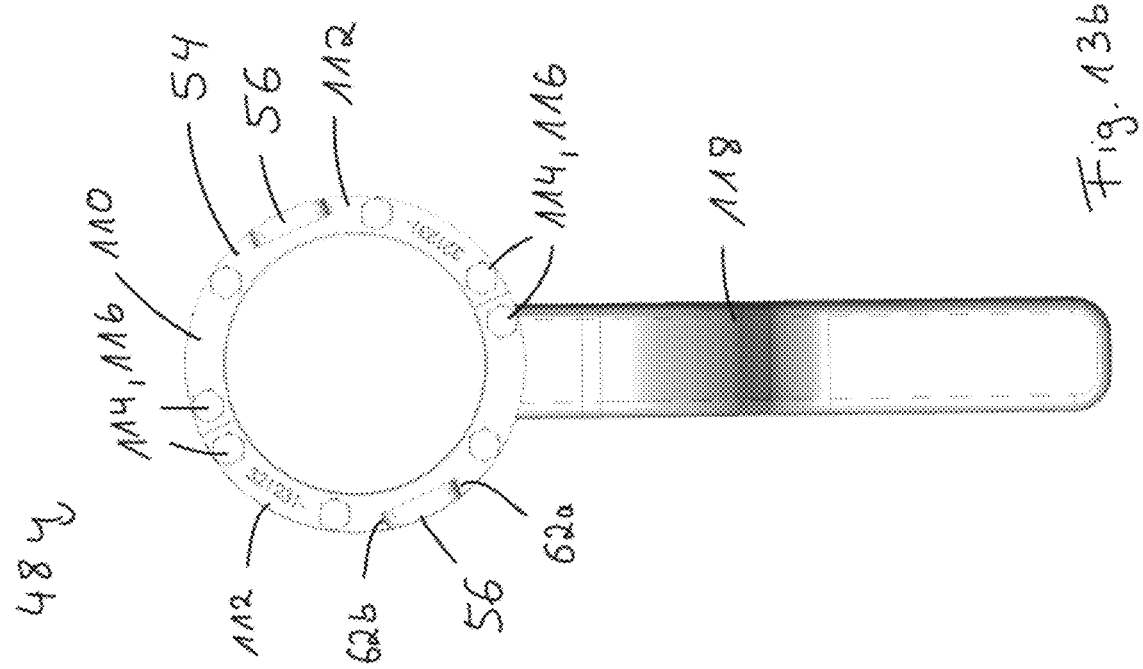

According to FIG. 2, first coupling means 50 are formed by two teeth 56 arranged at a first face end 58 of first turning tool 48, wherein teeth 56 protrudes against feeding direction F parallel to filling axis 26. Teeth 56 are trapezoidal and taper in feeding direction F. To ensure an easy handling, teeth 56 have rounded edges 60. Teeth 56 have a first tooth surface 62a and a second tooth surface 62b, wherein first tooth surface 62a is circumferentially opposite to second tooth surface 62b. First tooth surface 62a and second tooth surface 62b are at least substantially oriented perpendicular to filling axis 26. As shown in FIG. 13b, first tooth surface 62a and second tooth surface 62b have an angular distance in a range between 3° and 35°, in particular in a range between 5° and 30°, preferably about 20°. Teeth 56 have an angular distance about 180°, wherein the angular distance is the quotient of 360° and the amount of teeth 56. Preferably, teeth 56 have a radial thickness that is less than a radial thickness of first tool 48. Teeth 56 may be evenly arranged at the outer circumference of first tool 48.

In FIG. 2, first counter-coupling means 52 are formed by a protruding first ring 64 arranged at the outer circumference of adapter piece 28. First ring 64 comprises two first ring portions 66, wherein first ring portions 66 circumferentially enclose two first ring recesses 67. First ring recesses 67 are at least substantially oriented perpendicular to filling axis 26. First ring recesses 67 are enclosed by a first recess surface 68a and a second recess surface 68b, wherein both are at least substantially oriented perpendicular to filling axis 26. First recess surface 68a is circumferentially opposite to second recess surface 68b. First recess surface 68a and second recess surface 68b have an angular distance in a range between 5° and 40°, in particular in a range between 10° and 35°, preferably about 30°. First ring recesses 67 of first ring 64 have an angular distance in a range between 20° and 180°, in particular in a range between 60° and 180°, preferably about 180°, wherein the angular distance is the quotient of 360° and the amount of first ring recesses 67. First turning tool 48, in particular first tooth surface 62a, engage with first ring 64, in particular with first recess surface 68a, to tighten adapter piece 28 at outlet 16 of filling unit 14. First turning tool 48, in particular second tooth surface 62b, engage with first ring 64, in particular with second recess surface 68b, to untighten adapter piece 28 from outlet 16 of filling unit 14. To tighten adapter piece 28 at outlet 16, teeth 56 are inserted into first ring recesses 67 and first turning tool 48 is rotated around the filling axis 26 clockwise against feeding direction F, as shown in FIG. 8.

First tooth surface 62a and second tooth surface 62b have an angular distance that is smaller than the angular distance of first recess surface 68a and second recess surface 68b. Due to the greater dimension of first ring recesses 66 with regard to teeth 56, first turning tool 48 can be removed from the first position, in particular from the engagement with first counter-coupling means 52 without releasing the connection between adapter piece 28 and outlet 16 of filling unit 14.

Figure 5:
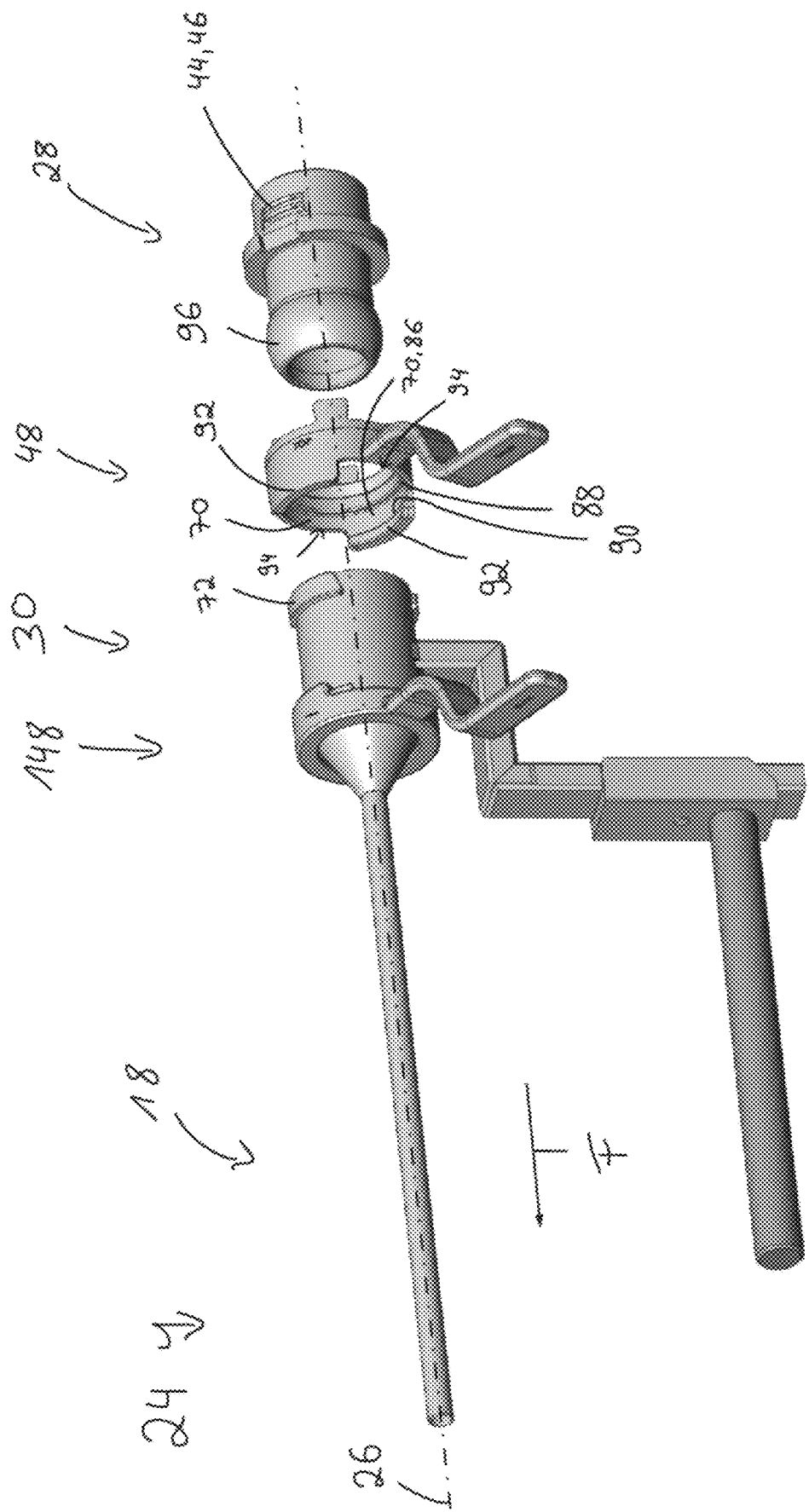
FIG. 5 shows an exploded front view of the coupling unit according to FIG. 2.

In FIG. 5, to releasably attach and/or tighten adapter piece 28 at connector piece 30, adapter piece 28 comprises a second coupling means 70 and connector piece 30 comprises a second counter-coupling means 72. First turning tool 48 can be moved in a second position at a second adapter end 74 to engage second coupling means 70 and second counter-coupling means 72, as shown in FIGS. 2 and 9, wherein the second position is spaced apart from the first position along filling axis 26. First turning tool 48 comprises a second tool end 75 facing connector piece 30, wherein second coupling means 70 are arranged at second tool end 75. Connector piece 30 comprises a first connector end 76 facing adapter piece 28. Second counter-coupling means 52 are arranged at first connector end 76.

Figure 4:
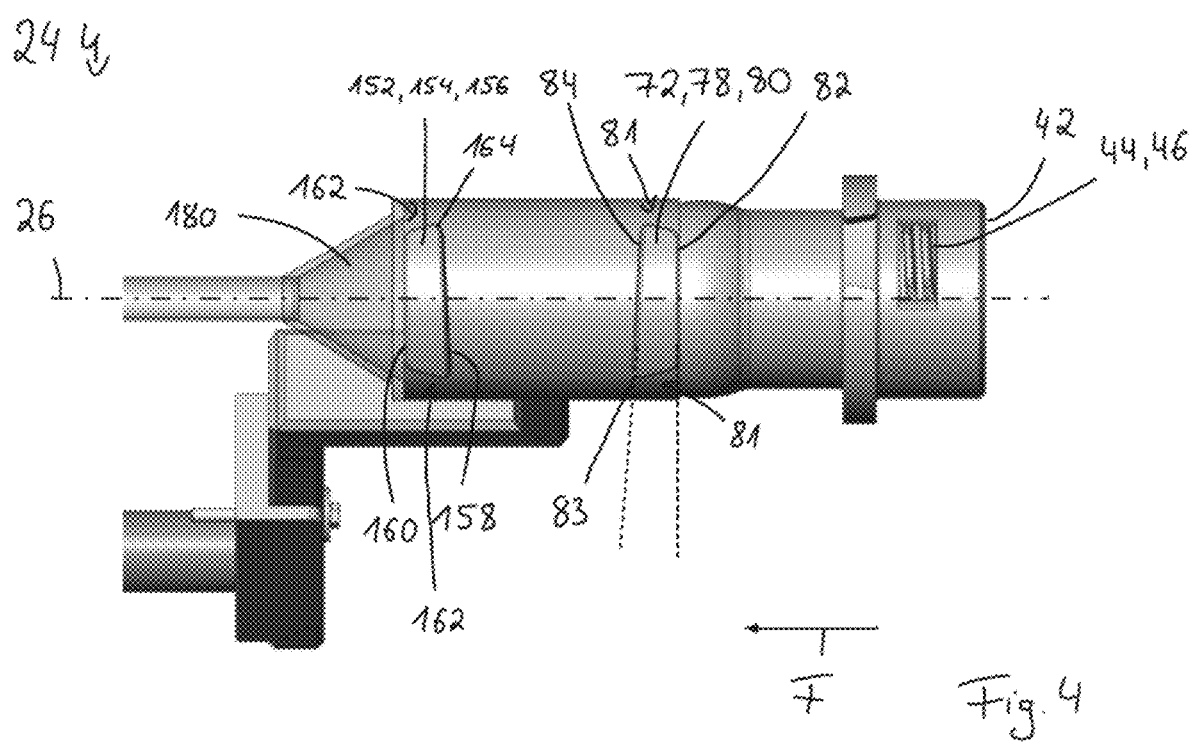
FIG. 4 shows a side view of the coupling unit according to FIG. 2, wherein a first tool and a second tool are not shown.

In FIG. 4, second counter-coupling means 72 is formed by an at least partially provided second ring 78 arranged at the outer circumference of connector piece 30 and protruding from the outer surface of connector piece 30. Partially provided second ring 78 widens along the outer circumference. Second ring 78 is formed by two wedge-shaped second ring portions 80, wherein each second ring portion 80 is enclosed by a first ring wall 82 facing adapter piece 28 and a second ring wall 84 facing filling tube 18. First ring wall 82 and second ring wall 84 are spaced apart from each other along filling axis 26. First ring wall 82 is even with the face end of connector piece 30 at first connector end 76. First ring wall 82 has no incline regarding filling axis 26, so the angle between first ring wall 82 and filling axis 26 is about 90°. The incline serves as a measure of the angle with respect to filling axis 26, as it is also known for threads on screws.

Second ring wall 84 is spaced apart from the face end of connector piece 30 at first connector end 76. Second ring wall 84 has an incline in a range between 0.1 mm and 2.00 mm, in particular in a range between 0.2 mm and 1.00 mm, preferably in a range between 0.4 mm and 0.8 mm, more preferably about 0.6 mm, as shown in FIG. 4 by a dotted line. The incline of second ring wall 84 is left-oriented regarding feeding direction F. Second ring portions 80 have an angular extension in a range between 45° and 135°, in particular between 60° and 120°, and preferably about 90°. Second ring portions 80 have an angular distance in a range between 45° and 180°, in particular in a range between 60° and 120°, and preferably about 90°, wherein the angular distance is the quotient of 360° and the amount of second ring portions 80. Two second ring recesses 81 are formed between two second ring portions 80, wherein second ring recesses 81 are trapezoidal and tapers in feeding direction F. Second ring recesses 81 are at least substantially oriented perpendicular to filling axis 26. To ensure an easy handling, second ring portions have rounded edges 83.

Figure 13A:
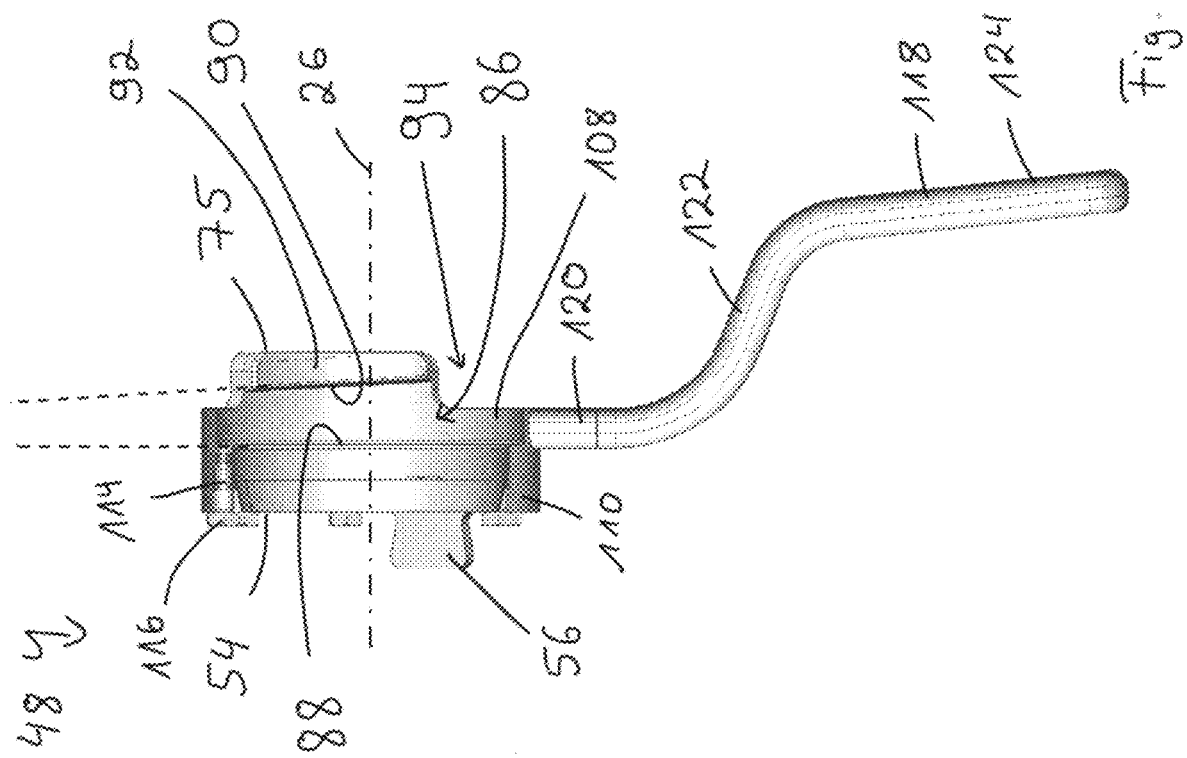
FIG. 13a shows a sectional view of the first tool according to FIGS. 11a and 11b.

In FIG. 5 and FIG. 13a, second coupling means 70 is formed by a first groove 86 arranged at the inner circumference of first turning tool 48, wherein first groove 86 tapers along the inner circumference. First groove 86 receives second ring 78 when adapter piece 28 is attached to connector piece 30. First groove 86 is enclosed by a first groove wall 88 at first tool end 54 of first turning tool 48, wherein first groove wall 88 is closer to first tool end 54 than to second tool end 75, and a second grove wall 90 at second tool end 75 of first turning tool 48, wherein first groove wall 88 and the second groove wall 90 are spaced apart to each other along filling axis 26. First groove wall 88 is circumferentially continuous. Second groove wall 90 comprises two second groove wall portions 92. Second groove wall portions 92 have an angular extension in a range between 45° and 135°, in particular between 60° and 120°, and preferably about 90°. Second groove wall portions 92 have an angular distance in a range between 45° and 180°, in particular in a range between 60° and 120°, and preferably about 90°, wherein the angular distance is the quotient of 360° and the amount of second groove wall portions 92. The gaps between two second groove wall portions 92 form two openings 94 to insert second ring 78, in particular second ring portions 80. First groove wall 88 has no incline regarding filling axis 26. Second groove wall 90 of each second groove wall portion 92 has an incline in a range between 0.1 mm and 2.00 mm, in particular in a range between 0.2 mm and 1.00 mm, preferably in a range between 0.4 mm and 0.8 mm, more preferably about 0.6 mm, shown in FIG. 13a by dotted line. The incline of second groove wall 90 is right-oriented regarding feeding direction F. The incline of second groove wall 90 is opposite oriented to the incline of second ring wall 84.

Figure 7:
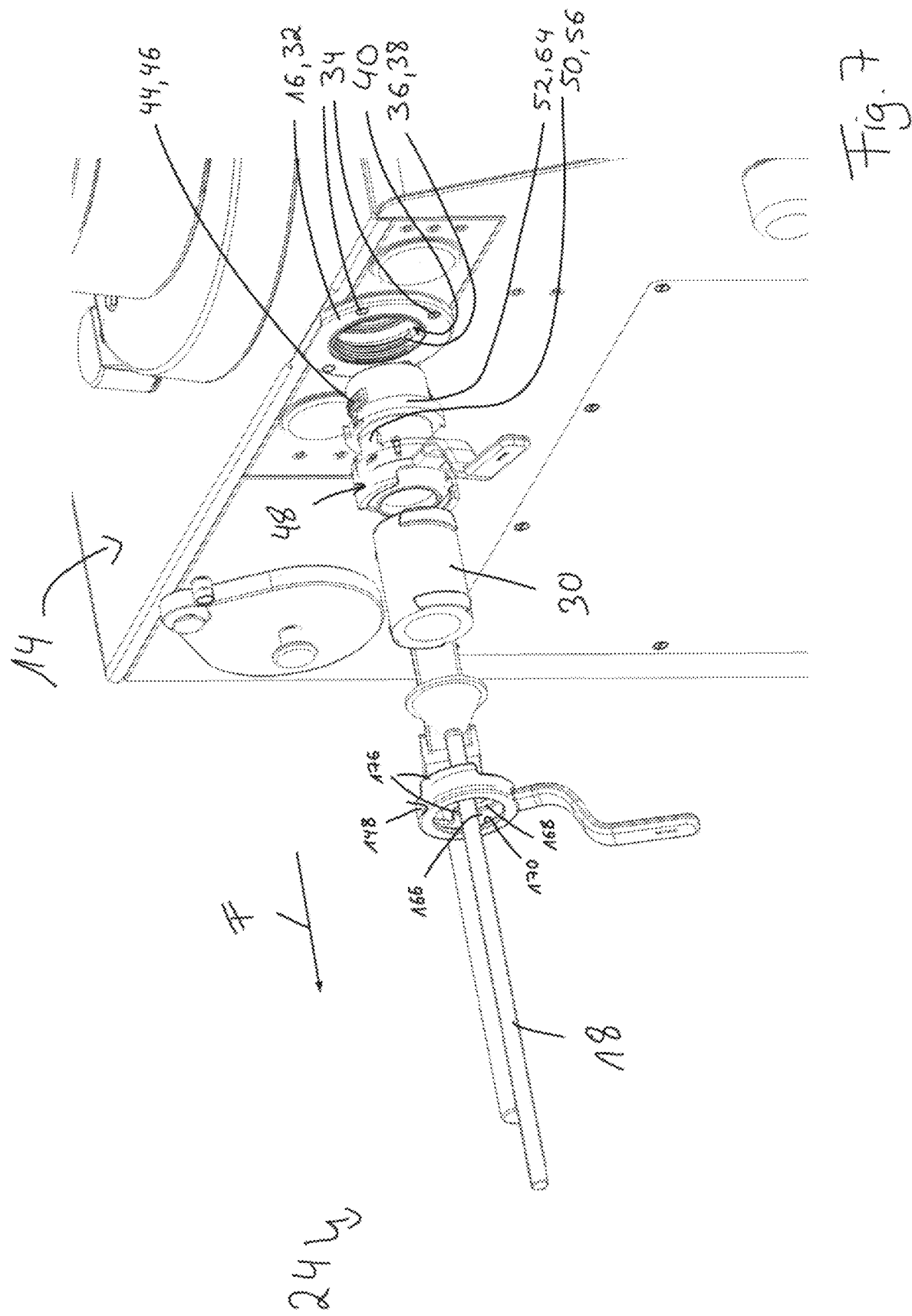
FIG. 7 shows an exploded front view of the coupling unit according to FIG. 2 with a filling unit.

To releasably attach connector piece 30 to adapter piece 28, connector piece 30 is arranged at adapter piece 28 and then first turning tool 48 is moved in the second position by translational movement along the filling axis 26 in feeding direction F, as shown in FIG. 7. A rotational alignment is necessary to position second ring portions 80 at openings 94 of groove wall portions 92. After a translational movement first groove 86 and second ring 76 are circumferentially positioned next to each other. Then, first turning tool 48 can be rotated around filling axis 26 clockwise against feeding direction F for clamping second ring 76 in first groove 86. Thus, adapter piece 28 and connector piece 30 are securely coupled. In the coupled state of adapter piece 28 and connector piece 30, first turning tool 48 covers partially adapter piece 28 and connector piece 30.

In FIGS. 3 and 5, adapter piece 28 has at a face end at his second tool end 75 a convex spherical joint area 96 to compensate an angular offset between filling unit 14 and clipping unit 22. Spherical joint area 96 is arranged at the outer circumference of adapter piece 28. Connector piece 30 has a concave socket 98 at a face end at his first connector end 76 to receive the spherical joint area 96. The spherical joint 60 allows an angle between adapter piece 26 and connector piece 28, so filling unit 14 and clipping unit 22 do not need an exact alignment. In FIG. 3, first turning tool 48 has an inner tool recess 100 facing connector piece 30 to prevent a contact between socket 98 and first turning tool 48 in the second position.

In FIGS. 3 and FIGS. 11a to 12b, first turning tool 48 is arranged non-detachably at adapter piece 28. Thus, first turning tool 48 is always within reach to assemble and disassemble adapter piece 28. Therefore, adapter piece 28 comprises a first stop 102 at first tool end 54 and a second stop 104 at second tool end 75, wherein, as shown in FIG. 3, first stop 102 has a first outer diameter D1 and second stop 104 has a second outer diameter D2. First outer diameter D1 and second outer diameter D2 are larger than a third outer diameter D3 of adapter piece 28 within first stop 102 and second stop 104. First outer diameter D1 and second outer diameter D2 are larger than the fourth inner diameter D4 of first turning tool 48. Thus, the movement of first turning tool 48 along the filling axis 26 is limited by first stop 102 against feeding direction F and by second stop 104 in feeding direction F. First stop 102 is formed by an adapter collar 106. Second stop is formed by spherical joint area 96. The first position of first turning tool 48 can be allocated to first stop 102 and second position of first turning tool 48 can be allocated to second stop 104. Adapter piece 28 and/or first turning tool 48 are further designed in such a way that first turning tool 48 is movable translationally and rotationally relative to adapter piece 28 and filling axis 26. Therefore, the fourth inner diameter D4 of first turning tool 48 is larger than third outer diameter D3 of adapter piece 28.

In FIGS. 11a to 12b, two embodiments are shown for realizing first turning tool 48 in a non-removable manner. In FIGS. 11a and 11b, first turning tool 48 is made up of three parts. In this case, first turning tool 48 comprises a tool base 108 and a tool cap 110, each of which is tubular. Tool base 108 is designed in such a way that it can be moved translationally across first stop 102, in particular joint area 96, and thus first turning tool 48 can be detached from adapter piece 28. Tool cap 110 comprises two tool cap portions 112, with both tool cap portions 112 preferably extending by 180°, shown in FIG. 13b. Tool cap portions 112 are placed against each other around adapter piece 28 and then brought up to second stop 104, in particular to joint area 96, in feeding direction F. Tool base 108 is brought up to tool cap portions 112 against feeding direction F in order to then connect tool cap portions 112 to tool base 108, in particular to screw them together by fastening means 114 like screws, shown in FIG. 13b. Fastening means 114 to assemble first turning tool 48 are arranged parallel to filling axis 26. Fastening means 114 have a fastening head 116, like a screw head, and wherein fastening head 116 is short, so first turning tool 48 can be moved translationally close to adapter collar 106. Fastening means 114 may be short to form a small first turning tool 48 with respect to filling axis 26, wherein more fastening means 114 can be provided to compensate the low force that can be absorbed by small fastening means 114. By screwing tool cap portions 112 to tool base 108, tool cap portions 112 form tool cap 110. Tool cap 110 is designed in such a way that first turning tool 48 cannot be moved in feeding direction F over joint area 96 and thus first turning tool 48 cannot be removed from adapter piece 28 in assemble state. For this purpose, tool cap 108 defines inner diameter D4 of first turning tool 48, wherein inner diameter D4 is smaller than first outer diameter D1 and second outer diameter D2. Thus, it is ensured that first turning tool 48 cannot be removed over second adapter end 74 of adapter piece 28, in particular joint area 96. Further, tool cap 110 ensures that by coupling first turning tool 48 and connector piece 30 adapter piece 28 is biased to connector piece 30. Due to the multi-part design of first turning tool 48, first turning tool 48 can be arranged on adapter piece 28 and, when assembled, cannot be detached from adapter piece 28 and moved between first stop 102 and second stop 104. Therefore joint area 96 and/or adapter collar 106 can be initially provided at adapter piece 28, wherein joint area 96 and/or adapter collar 106 can be manufactured from the solid.

In FIGS. 12a and 12b, another embodiment of first turning tool 48 and adapter piece 28 is shown. First turning tool 48 is made up of one part, so no assembly of first turning tool 48 is necessary. Therefore, at least one of joint area 96 or adapter collar 106 cannot be initially provided on adapter piece 28. In this embodiment adapter collar 106 is additionally arranged at adapter piece 28. To arrange first turning tool 48 at adapter piece 28, in a first step first turning tool 48 has to be shifted over first tool end 54 and in a second step adapter collar 106 has to be arranged at adapter piece 28. Adapter collar 106 can be releasably arranged at adapter piece 28, e.g., by screwing it on, or can be not-releasably arranged at adapter piece 28 by means of shrink-fitting as it is shown in FIGS. 12a and 12b. In this embodiment adapter collar 106 provides adapter thread 44 of adapter piece 28, so that this can only be provided with adapter collar 106. A combination of the embodiments of FIGS. 11a and 12a is nevertheless conceivable. So, that first turning tool 48 is designed in three parts, as in FIGS. 11a and 11b, and that adapter collar 106 is provided on adapter piece 26 after first turning tool 48 is attached to adapter piece 28, as in FIGS. 12a and 12b. It is advantageous if adapter piece 28 and/or adapter collar 106 are individualized regarding filling unit 14 or outlet 16, so connector piece 30 and/or filling tube 18 can be a standard component that has no to be individualized regarding filling unit 14 and/or outlet 16.

To attach and detach adapter piece 28 from outlet 16 and/or connector piece 30, first turning tool 48 comprises a first lever 118 that can be gripped by an operator to provide a translational and rotational movement of first turning tool 48 relative to filling axis 26, as shown in FIG. 2. First lever 118 is formed substantially z-shaped. First lever 118 comprises a first lever portion 120 that is arranged at a tubular tool ring 119 of first turning tool 48 or at tool base 108, if first turning tool 48 comprises a separate tool base 108, and that is substantially perpendicular to filling axis 26. First lever 118 comprises a second lever portion 122 that is arranged at first lever portion 118 and that is oblique to filling axis 26, in particular has an angle in a range between 30° and 60° to filling axis 26. First lever 118 comprises a third lever portion 124 that is arranged at second lever portion 122 and that is oblique to filling axis 26, in particular has an angle in a range between 70° and 90° to filling axis 26. First lever 118, in particular second lever portion 122 and third lever portion 124, is inclined away from filling unit 14, so a user can easily handle first turning tool 48 without bumping against filling unit 14.

Figure 6:
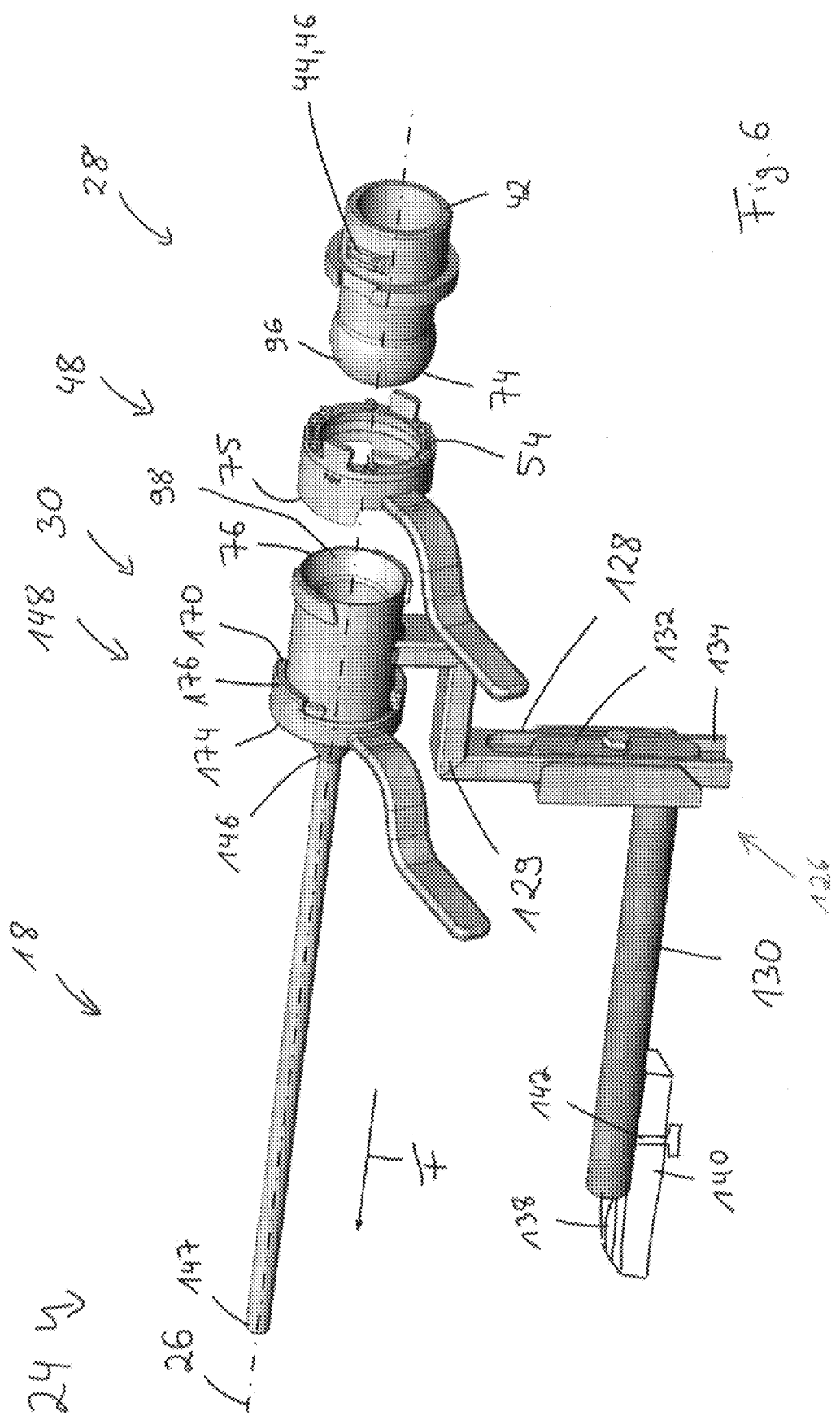
FIG. 6 shows an exploded rear view of the coupling unit according to FIG. 2.

By coupling adapter piece 28 and connector piece 30 to outlet 16, clipping unit 22 is fixed at filling unit 14. Therefore, connector piece 30 comprises a non-detachable connector rod 126, as shown in FIG. 6. Connector rod 126 comprises a first rod portion 128 that is at least approximately perpendicular to filling axis 26 and a second rod portion 130 that is arranged at first rod portion 128 and that is arranged at least approximately parallel to filling axis 26. First rod portion 128 is arranged at connector piece 30 by a L-shaped rod section 129. First rod portion 128 is adjustable perpendicular to filling axis 26 to define the height of connector piece 30. Therefore, first rod portion 128 has a first sliding element 132 that is moveable inside a first guidance 134. If connector piece 30 has the suitable height regarding filling unit 18, first sliding element 132 is fixed at guidance 134 by fastening means 136. Second rod portion 130 is adjustable perpendicular to filling axis 26 to define the distance between filling unit 18 and clipping unit 22. Therefore, second rod portion 130 has a second sliding element 138 that is moveable inside a second guidance 140. If the distance between filling unit 14 and clipping unit 22 is suitable, second sliding element 138 is fixed at second guidance 140 by fastening means 142. Filling tubes 18 usually differentiate in steps of 10 cm.

Further, filling tube 18 can be coupled to connector piece 30 to provide a discharging of the filling material into packaging casing 12. In FIGS. 9 and 10, connector piece 30 comprises a second connector end 144 facing filling tube 18 spaced apart from first connector end 76 along filling axis 26. Filling tube 18 comprises a first tube end 146 facing connector piece 30, and a second tube end 147 spaced apart to first tube end 144 along filling axis 26, wherein the discharge opening 20 is provided at second tube end 147. To attach connector piece 30 to filling tube 18 a second turning tool 148 can be arranged at connector piece 30. Therefore, second turning tool 148 comprises third coupling means 150 that is arranged at first tool end 149 of second tool facing connector piece 30 and connector piece 30 comprises third counter coupling means 152 that is arranged at second connector end 144.

In FIG. 4, third counter-coupling means 152 is formed by an at least partially provided third ring 154 arranged at the outer circumference of connector piece 30 and protruding therefrom. Third ring 154 widens along the outer circumference and is formed by two wedge-shaped third ring portions 156, wherein each third ring portion 156 is enclosed by a first ring wall 158 facing adapter piece 28 and a second ring wall 160 facing filling tube 18, wherein first ring wall 158 and second ring wall 160 are spaced apart from each other along filling axis 26. Second ring wall 160 is even with the face end of connector piece 30 at second connector end 144. Second ring wall 160 has no incline regarding filling axis 26. First ring wall 158 is spaced apart from the face end of connector piece 30 at second connector end 144. First ring wall 158 has an incline in a range between 0.1 mm and 2.00 mm, in particular in a range between 0.2 mm and 1.00 mm, preferably in a range between 0.4 mm and 0.8 mm, more preferably about 0.6 mm. The incline of first ring wall 158 is right-oriented regarding feeding direction F. Third ring portions 156 have an angular extension in a range between 45° and 135°, in particular between 60° and 120°, and preferably about 90°. Third ring portions 156 have an angular distance in a range between 45° and 180°, in particular in a range between 60° and 120°, and preferably about 90°, wherein the angular distance is the quotient of 360° and the amount of third ring portions 156. Two third ring recesses 162 are formed between two third ring portions 156, wherein third ring recesses 162 are trapezoidal and tapers against feeding direction F. To ensure an easy handling, second ring portions have rounded edges 164.

In FIG. 7, third coupling means 150 is formed by a second groove 166 arranged at the inner circumference of second turning tool 148, wherein second groove 166 tapers along the inner circumference. Second groove 166 receives third ring 154 when connector piece 30 is attached to filling tube 18. Second groove 166 is enclosed by a first groove wall 168 at a first tool end 170 of second turning tool 148 and a second grove wall 172 at a second tool end 174 of second turning tool 148, wherein first groove wall 168 and second groove wall 172 are spaced apart to each other along filling axis 26. Second groove wall 172 is circumferentially continuous. First groove wall 168 comprises two first groove wall portions 176. First groove wall portions 176 have an angular extension in a range between 45° and 135°, in particular between 60° and 120°, and preferably about 90°. First groove wall portions 176 have an angular distance in a range between 45° and 180°, in particular in a range between 60° and 120°, and preferably about 90°, wherein the angular distance is the quotient of 360° and the amount of first groove wall portions 176. The gaps between two first groove wall portions 176 form two openings 178 to insert third ring 154, in particular third ring portions 156. Second groove wall 172 has no incline regarding filling axis 26. First groove wall 168 of each first groove wall portion 176 has an incline in a range between 0.1 mm and 2.00 mm, in particular in a range between 0.2 mm and 1.00 mm, preferably in a range between 0.4 mm and 0.8 mm, more preferably about 0.6 mm. The incline of first groove wall 168 is right-oriented regarding feeding direction F. The incline of first groove wall 168 is opposite oriented to the incline of second ring wall 160.

In FIGS. 8 and 9, to releasably attach connector piece 30 to filling tube 18, second turning tool 148 is slid over the free end at second tube end 148 of filling tube 18 and moved to the first tube end 146 of filling tube 18 against feeding direction F.

Filling tube 18 comprises a tube cone 180 and tube stop 182 at first tube end 146, wherein tube stop 182 has an outer diameter that is larger than the inner diameter of second turning tool 148. Thus, the second turning tool 148 is limited in the translational movement against feeding direction F. Then, filling tube 18 along with second turning tool 148 is arranged at connection piece 30 and second turning tool 148 is moved rotationally clockwise against feeding direction F to couple filling tube 18 and connector piece 30. In doing so, third ring 154 clamps with second groove 166. In the coupled state of connector piece 30 and filling tube 18, second turning tool 148 covers partially connector piece 30 and filling tube 18.

In FIG. 2, second turning tool 148 comprises a second lever 184 that can be gripped by an operator to provide a translational and rotational movement of second tool 184 relative to filling axis 26. First lever 184 is formed substantially z-shaped. First lever 184 comprises a first lever portion 186 that is arranged at a tubular tool ring 188 of second turning tool 148 and that is substantially perpendicular to filling axis 26. Second lever 184 comprises a second lever portion 190 that is arranged at first lever portion 186 and that is oblique to filling axis 26, in particular has an angle in a range between 30° and 60° to filling axis 26. Second lever 184 comprises a third lever portion 192 that is arranged at second lever portion 190 and that is oblique to filling axis 26, in particular has an angle in a range between 70° and 90° to filling axis 26. First lever 184, in particular second lever portion 190 and third lever portion 192, is inclined away from first lever 118, so a user can easily handle second turning tool 148 without bumping against first turning tool 48.

LIST OF REFERENCE SIGNS (PART OF THE DESCRIPTION)

- 10 production system
- 12 packaging casing
- 14 filling unit
- 16 outlet of filling unit
- 18 filling tube
- 20 discharge opening
- 22 clipping unit
- 24 coupling unit
- 26 filling axis
- 28 adapter piece
- 30 connector piece
- 32 mounting ring
- 34 fastening means of mounting ring
- 36 outlet thread
- 38 outlet thread portion
- 40 outlet thread recess
- 42 first adapter end
- 44 adapter thread
- 46 adapter thread portion
- 48 first tool
- 50 first coupling means
- 52 first counter coupling means
- 54 first tool end
- 56 teeth of first tool
- 58 first face end of first tool
- 60 rounded edges of tooth
- 62a first tooth surface
- 62b second tooth surface
- 64 first ring of adapter piece
- 66 first ring portion
- 67 first ring recess
- 68a first recess surface
- 68b second recess surface
- 70 second coupling means
- 72 second counter coupling means
- 74 second adapter end
- 75 second tool end
- 76 first connector end

| | |
|---|---|
| 78 second ring of connector piece | D2 second diameter of second stop |
| 80 second ring portion | D3 third diameter of adapter piece |
| 81 second ring recess | D4 fourth diameter of first tool |
| 82 first ring wall of second ring | |
| 83 rounded edges of second ring | |
| 84 second ring wall of second ring | |
| 86 first groove | |
| 88 first groove wall of first groove | |
| 90 second grove wall of first groove | |
| 92 second groove wall portion of first groove | |
| 94 opening of second groove wall | |
| 96 joint area | |
| 98 socket | |
| 100 tool recess | |
| 102 first stop | |
| 104 second stop | |
| 106 adapter collar | |
| 108 tool base | |
| 110 tool cap | |
| 112 tool cap portion | |
| 114 fastening means of first tool | |
| 116 fastening head of first tool | |
| 118 first lever | |
| 120 first lever portion of first lever | |
| 122 second lever portion of first lever | |
| 124 third lever portion of first lever | |
| 126 connector rod | |
| 128 first rod portion | |
| 129 rod section | |
| 130 second rod portion | |
| 132 first sliding element | |
| 134 first guidance | |
| 136 fastening means of first rod portion | |
| 138 second sliding element | |
| 140 second guidance | |
| 142 fastening means of second rod portion | |
| 144 second connector end | |
| 146 first tube end | |
| 147 second tube end | |
| 148 second tool | |
| 149 first tool end of second tool | |
| 150 third coupling means | |
| 152 third counter coupling means | |
| 154 third ring of connector piece | |
| 156 third ring portion | |
| 158 first ring wall of third ring | |
| 160 second ring wall of third ring | |
| 162 third ring recess | |
| 164 rounded edges of third ring | |
| 166 second groove | |
| 168 first groove wall of second groove | |
| 170 first tool end of second tool | |
| 172 second grove wall of second groove | |
| 174 second tool end of second tool | |
| 176 first groove wall portions of second groove | |
| 178 opening of second groove | |
| 180 tube cone | |
| 182 tube stop | |
| 184 second lever | |
| 186 first lever portion of second lever | |
| 188 tool ring | |
| 190 second lever portion of second lever | |
| 192 third lever portion of second lever | |
| F feeding direction | |
| D1 first diameter of first stop | |

The invention claimed is:

1. A production system for producing sausage-shaped products, in particular sausages, containing a flowable filling material in a tubular or bag-shaped packaging casing, the production system comprising:
a filling unit for providing and conveying the filling material in filling direction into the tubular or bag-shaped packaging casing, the filling unit comprising an outlet;
a clipping unit for closing the packaging casing filled with the filling material; and
a coupling unit extending along a filling axis for coupling the filling unit and the clipping unit, the coupling unit comprising:
an adapter piece configured to be assembled to the outlet of the filling unit; and
a connector piece configured to connect the clipping unit and the adapter piece;
a filling tube configured to be connected to the connector piece for feeding filling material into the tubular or bag-shaped packaging casing stored on the filling tube,
wherein the coupling unit comprises at least one first tool for assembling the adapter piece to and disassembling the adapter piece from the outlet of the filling unit and for assembling the adapter piece to and disassembling the adapter piece from the connector piece, and
wherein the coupling unit comprises at least one first tool for assembling the adapter piece to and disassembling the adapter piece from the connector piece,
wherein the at least one first tool is captively held on the adapter piece and wherein the at least one first tool is arranged rotationally and/or translationally movable relative to the filling axis along the adapter piece.

2. The production system according to claim 1, wherein the adapter piece comprises a first adapter end facing the outlet of the filling unit and a second adapter end facing the connector piece, and wherein the adapter piece has a first stop, which is arranged closer to the first adapter end than to the second adapter end, and/or a second stop in the region of the second adapter end to limit the movement of the at least one first tool.

3. The production system according to claim 1, wherein the at least one first tool and/or the adapter piece is made of two or more parts, and wherein the at least one first tool is assembled around the adapter piece, and/or wherein the adapter piece is assembled after the at least one first tool is arranged around the adapter piece.

4. The production system according to claim 1, wherein the at least one first tool is moveable between a first position for releasably attaching the adapter piece to the outlet of the filling unit and a second position for releasably attaching the adapter piece to the connector piece, and wherein the first position and the second position are spaced apart from each other along the filling axis.

5. The production system according to claim 1, wherein the at least one first tool comprises at least one first coupling means and the adapter piece comprises at least one first counter-coupling means to releasably engage the at least one first tool and the adapter piece, and/or wherein the at least one first tool comprises at least one second coupling means and the connector piece comprises at least one second counter-coupling means to releasably engage the at least one first tool and the connector piece, wherein, preferably, the at least one first coupling means is formed by at least one tooth or by a first ring with at least one recess to receive the at least one tooth, and wherein the at least one first counter-coupling means is formed by a first ring with at least one recess to receive the at least one tooth or by at least one tooth.

6. The production system according to claim 5, wherein the at least one second coupling means is formed by a second ring, preferably a widening ring, or by a first groove, preferably a tapering groove, to receive the second ring.

7. The production system according to claim 5, wherein the at least one second counter-coupling means is formed by a first groove, preferably a tapering groove, to receive the second ring or by a second ring, preferably a widening ring.

8. The production system according to claim 1, wherein the adapter piece and the connector piece are designed in such a way, that they form an articulated connection.

9. The production system according to claim 1, wherein the adapter piece comprises a joint area, preferably a spherical joint area, to allow an angular offset between the filling unit and the clipping unit or a socket to receive the joint area, and wherein the connector piece comprises a socket to receive the joint area, or a joint area, preferably a spherical joint area, to allow an angular offset between the filling unit and the clipping unit.

10. The production system according to claim 1, wherein the connector piece is adapted to be connected to the filling tube by means of at least one second tool which is configured to be arranged at the connector piece, and which, preferably, comprises third coupling means that are arranged at the first tool end of the at least one second tool facing connector piece.

11. The production system according to claim 10, wherein the connector piece comprises third counter coupling means that are arranged at the second connector end of the connector piece.

12. The production system according to claim 1, wherein the connector piece is connected to the clipping unit by a connector rod, wherein the connector rod is adjustable parallel and/or perpendicular to the filling axis to ensure a suitable distance between the filling unit and the clipping unit and/or a suitable height of the coupling unit, in particular of the filling tube.

13. The production system according to claim 1, wherein the at least one first tool comprises at least one lever to handle the at least one first tool.

14. The production system according to claim 13, wherein the at least one lever is substantially inclined away from the filing unit.

15. The production system according to claim 1, wherein the coupling unit, in particular the adapter piece and/or the connector piece and/or the filling tube, is conical and tapers in filling direction.

16. A coupling unit for use in a production system for producing sausage-shaped products, in particular sausages, the production system comprising:
  a filling unit for providing and conveying a filling material in feeding direction into tubular or bag-shaped packaging casing, the filling unit comprising an outlet; and
  a clipping unit for closing the packaging casing filled with the filling material,
  wherein the coupling unit extends along a filling axis and couples the filling unit and the clipping unit, the coupling unit comprising:
  an adapter piece configured to be arranged at the outlet of the filling unit;
  a connector piece configured to connect the clipping unit and the adapter piece; and
  at least one first tool for assembling the adapter piece to and for disassembling the adapter piece from the outlet of filling unit and for assembling the adapter piece to and for disassembling the adapter piece from the connector piece, and at least one first tool for assembling the adapter piece to and for disassembling the adapter piece from the connector piece, wherein the at least one first tool is configured to be captively held on the adapter piece and wherein the at least one first tool is arranged rotationally and/or translationally movable relative to the filling axis along the adapter piece.

17. A method for assembling a coupling unit according to claim 16 for use in a production system, the method comprising the following steps:
  a) move the at least one first tool translationally along the filling axis against the feeding direction in the first position;
  b) move the at least one first tool rotationally around the filling axis for attaching the adapter piece to the outlet of filling unit;
  c) move the at least one first tool rotationally around the filling axis in the opposite direction, wherein the rotational movement in step c) is smaller than in step b);
  d) move the at least one first tool translationally along the filling axis in feeding direction in the second position;
  e) move the at least one first tool rotationally around the filling axis for coupling the adapter piece and the connector piece.

* * * * *